(12) United States Patent
Nakagawa

(10) Patent No.: US 8,874,028 B2
(45) Date of Patent: Oct. 28, 2014

(54) TERMINAL DEVICE, RELAY DEVICE, AND BASE STATION COMMUNICATION METHOD

(75) Inventor: Takao Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1092 days.

(21) Appl. No.: 12/874,637

(22) Filed: Sep. 2, 2010

(65) Prior Publication Data

US 2011/0212685 A1 Sep. 1, 2011

(30) Foreign Application Priority Data

Sep. 3, 2009 (JP) ................................. 2009-204077

(51) Int. Cl.
| | |
|---|---|
| *H04B 1/60* | (2006.01) |
| *H04B 17/02* | (2006.01) |
| *H04W 28/06* | (2009.01) |
| *H04B 7/26* | (2006.01) |
| *H04B 7/155* | (2006.01) |
| *H04W 84/04* | (2009.01) |

(52) U.S. Cl.
CPC ............. *H04W 28/06* (2013.01); *H04B 7/2606* (2013.01); *H04W 84/047* (2013.01); *H04B 7/15557* (2013.01)
USPC ............................................................ 455/9

(58) Field of Classification Search
CPC ... H04B 7/026; H04W 72/1257; H04W 24/10
USPC ............................................................ 455/7
See application file for complete search history.

(56) References Cited

U.S. PATENT DOCUMENTS

| | | | | |
|---|---|---|---|---|
| 6,665,521 | B1 * | 12/2003 | Gorday et al. ............. | 455/67.11 |
| 7,224,954 | B2 | 5/2007 | Okajima et al. | |
| 2006/0083191 | A1 | 4/2006 | Niwano et al. | |

| | | | | |
|---|---|---|---|---|
| 2007/0147323 | A1 * | 6/2007 | Matsui et al. ................. | 370/338 |
| 2008/0063097 | A1 | 3/2008 | Horiuchi et al. | |

(Continued)

FOREIGN PATENT DOCUMENTS

| | | |
|---|---|---|
| EP | 2056617 | 5/2009 |
| JP | 2001-189971 A | 7/2001 |
| KR | 2007-0086887 | 8/2007 |
| KR | 2008-0079021 | 8/2008 |

(Continued)

OTHER PUBLICATIONS

"Korean Office Action", mailed by Korean Patent Office and corresponding to Korean application No. 10-2010-85859 on Jun. 29, 2011, with English translation.

(Continued)

*Primary Examiner* — Ankur Jain
(74) *Attorney, Agent, or Firm* — Fujitsu Patent Center

(57) ABSTRACT

A communication method includes at a relay device, receiving first data from the base station, the first data including first control information that represents a first communication mode from the base station to the relay device, adding second control information to the received first data, the second control information representing a second communication mode from the relay device to the terminal device, and relaying second data to the terminal device, the second data including the first data added with the second control information; and at a terminal device, receiving the first data of the first communication mode storing the first data in a buffer, performing reception processing on the second data based on the second control information included in the second data, performing reception processing on the first data based on the first control information included in the second data, and combining the first and second data.

6 Claims, 23 Drawing Sheets

(56) References Cited

U.S. PATENT DOCUMENTS

2008/0207193 A1     8/2008    Oh et al.
2009/0190536 A1     7/2009    Zhang et al.

FOREIGN PATENT DOCUMENTS

WO    WO-2006/035902      4/2006
WO    WO-2008/136830     11/2008

OTHER PUBLICATIONS

"Extended European Search Report", mailed by European Patent Office and corresponding to European application No. 10174936.4 on May 30, 2011.

Peters, et al., "The future of WiMAX: Multihop relaying with IEEE 802.16j", IEEE Communications Magazine, IEEE Service Center, Piscataway, US, vol. 47, No. 1, Jan. 1, 2009, pp. 104-111.

Texas Instruments, "Decode and Forward Relays for E-UTRA enhancements", 3GPP DRAFT; R1-084446, 3RD Generation Partnership Project (3GPP), Mobile Competence Centre; 650, Route Des Lucioles; F-06921 Sophia-Antipolis Cedex; France, no. Prague, Czech Republic; Nov. 5, 2008, XP050317704, pp. 1-5.

Yu, Guanding et al., "Adaptive Power Allocation for Cooperative Relaying System in Fading Wireless Channel", Wireless Communications, Networking and Mobile Computing, 2007, WICOM 2007, International Conference on, IEEE, Piscataway, NJ, USA, Sep. 21, 2007, pp. 1116-1119.

\* cited by examiner

FIG.14

| NUMBER | MODULATION SCHEME | CODING RATE |
|---|---|---|
| 1 | QPSK | 0.2 |
| 2 | QPSK | 0.4 |
| 3 | QPSK | 0.6 |
| : | 16QAM | 0.6 |
|  | 16QAM | 0.8 |
|  | 64QAM | 0.6 |
| 31 | 64QAM | 0.8 |

FIG.15

| index | COMMUNICATION SCHEME USED IN BS TO RN (COMMUNICATION MODE FROM RN TO UE IS USED AS STANDARD) | NUMBER OF BITS USED | EXAMPLE O BIT ARRANGEMENT |
|---|---|---|---|
| 1 | SAME RU, SAME MODIFICATION SCHEME | 3bit (index) | 001 |
| 2 | SAME RU, MODIFICATION SCHEME IS ONLY CHANGED | 8bit (index+5bit) | 010 + xxxxx(MODULATION SCHEME) |
| 3 | HALVE RU NUMBER (STARTING RU IS THE SAME), SAME MODULATION SCHEME | 3bit (index) | 011 |
| 4 | HALVE RU NUMBER (STARTING RU IS THE SAME), MODULATION SCHEME IS CHANGED | 8bit (index+5bit) | 100 + xxxxx(MODULATION SCHEME) |
| 5 | DOUBLE RU NUMBER (STARTING RU IS THE SAME), SAME MODULATION SCHEME | 3bit (index) | 101 |
| 6 | DOUBLE RU NUMBER (STARTING RU IS THE SAME), MODULATION SCHEME IS CHANGED | 8bit (index+5bit) | 110 + xxxxx(MODULATION SCHEME) |
| 7 | MODULATION SCHEME IS COMPLETELY CHANGED | 33bit (index+30bit) | NORMAL SPECIFICATION METHOD |

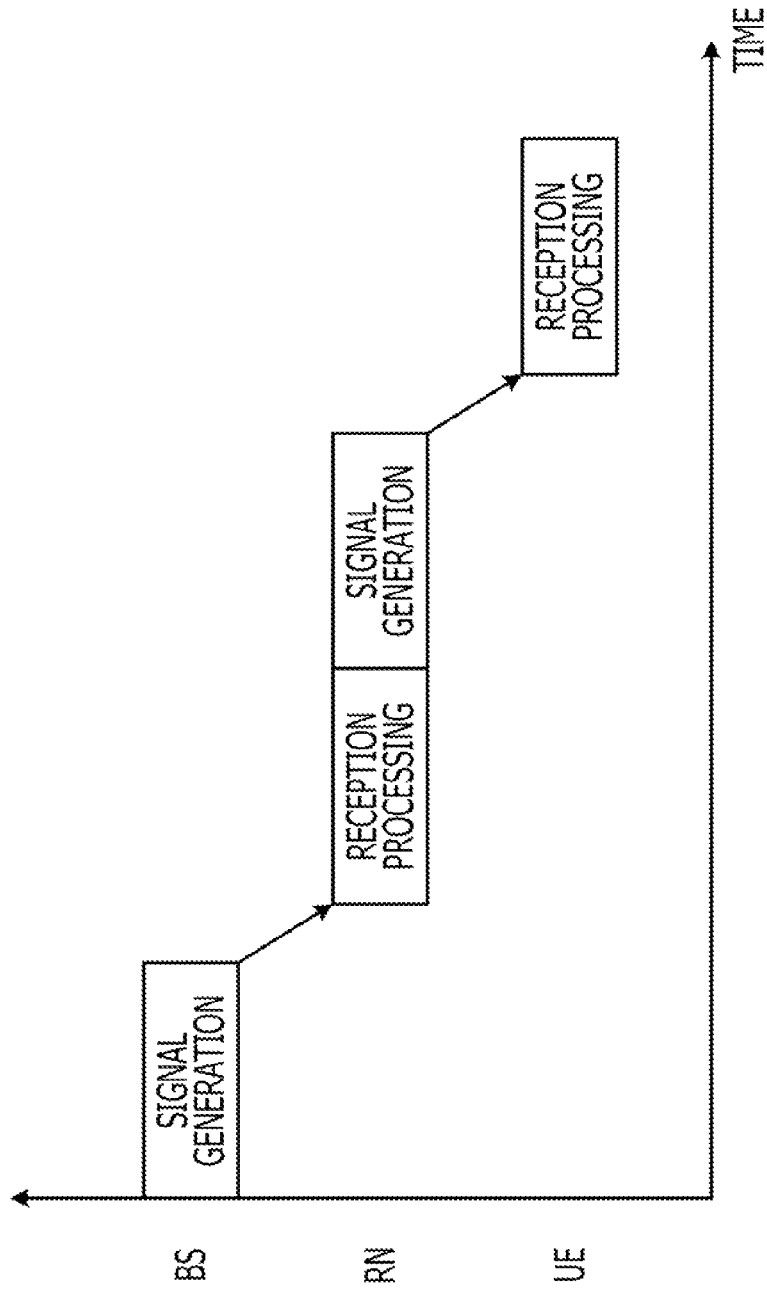

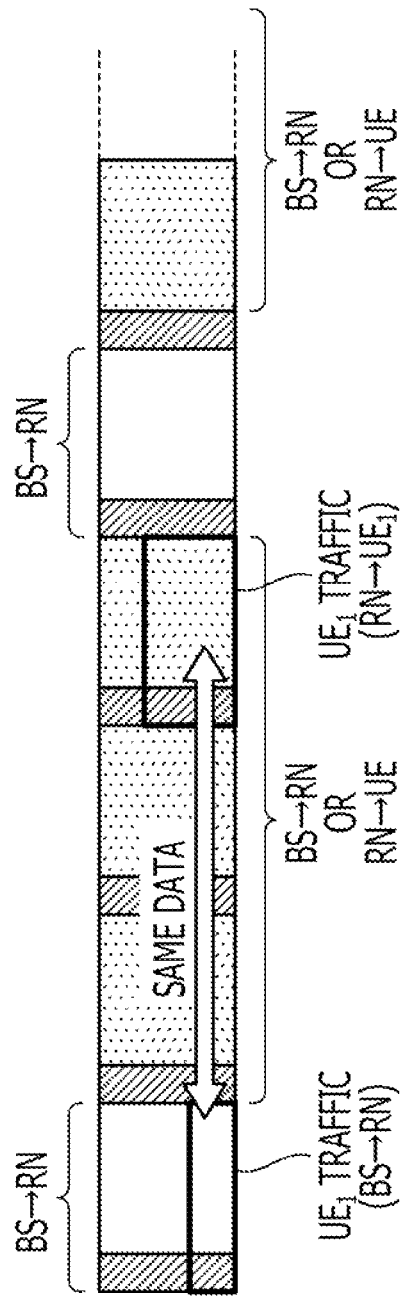

TERMINAL DEVICE, RELAY DEVICE, AND BASE STATION COMMUNICATION METHOD

CROSS-REFERENCE TO RELATED APPLICATIONS

This application is based upon and claims the benefit of priority of the prior Japanese Patent Application No. 2009-204077, filed on Sep. 3, 2009, the entire contents of which are incorporated herein by reference.

FIELD

The embodiment(s) discussed herein are related to a communication method, a relay device, a terminal device, and a base station.

BACKGROUND

In recent years, the 3GPP (3rd Generation Partnership Project) group meeting has specified LTE-A (Advance) as an evolutionary communication system of LTE (Long Term Evolution), a high speed data communication technology for terminal devices such as cellular phones. The 3GPP group meeting has also investigated the specification of a communication system using a relay device for communication between a terminal device and a base station.

FIG. 21 shows an example configuration of a communication system according to a related technology. In FIG. 21, BS represents a base station, RN represents a relay node as a relay device, and UE represents a user equipment as a terminal device.

As shown in FIG. 21, for example, a related communication system includes the base station BS, the relay node RN, the user equipment $UE_1$, and the user equipment $UE_2$. In addition, the relay node RN is included in a cell, the communication area of the base station and the user equipments $UE_1$ and $UE_2$ are included in the communication area of the relay node RN. However, any of the user equipments UE, like the user equipment $UE_2$, is not always included in the cell, the communication area of the base station BS. Here, FIG. 21 represents the communication system that includes the base station BS, the relay node RN, and two user equipments UE. However, the cell may include a plurality of relay nodes RN having a plurality of user equipments in the communication area.

In the aforementioned configuration of the communication system, for example, when data transmission between the base station BS and the user equipment $UE_1$ is performed, the relay node RN relays data to perform data transmission/reception. Likewise, when data transmission is performed between the base station BS and the user equipment $UE_2$, the relay node RN relays data to perform data transmission/reception. Regarding the modes of communication among the respective devices, furthermore, a communication mode between the base station and the relay node RN is different from the user communication mode between the relay node RN and the user equipment. The term "communication mode" used herein refers to information about a mode required for the reception procedure described later.

Next, the steps of the process carried out in the related communication system are described with reference to FIG. 22. FIG. 22 is a diagram illustrating the steps of the process in the related communication system. The user equipment UE shown in FIG. 22 is one included in the communication area of the relay node RN present in the cell of the base station BS. The user equipment UE may be either the user equipment $UE_1$ or the user equipment $UE_2$ shown in FIG. 21.

For example, as shown in FIG. 22, the base station BS generates a signal to transmit data to the relay node RN. The relay node RN receives the data from the base station BS and then performs the reception processing on the received data. Subsequently, the RN performs signal generation, or re-encoding, on the data subjected to the reception processing, followed by transmitting the data to a destination device, the user equipment UE, after predetermined processing delay. Subsequently, after receiving the data transmitted from the relay node RN, the user equipment UE carries out the reception processing on the data.

Although FIG. 22 describes the steps of the process carried out in a downlink (DL) from the base station BS to the user equipment UE, a similar process is also carried out using in a uplink (UL) where the user equipment UE is used as a source and the base station BS as a destination.

FIG. 23 illustrates an example of the transmission/reception frame in the related communication system. In FIG. 23, the user equipment $UE_1$ shown in FIG. 21 is used as an example of the user equipment UE in a communication area of the relay node RN in the cell of the base station BS.

As shown in FIG. 23, for example, traffic for $UE_1$ is included in one subframe when the base station BS sends data to the relay node RN. When sending the data from the base station BS to the relay node RN, control information, which represents a mode for communication from the base station BS to the relay node RN is stored in the head of the frame. Thus, the data is stored in the data area, followed by being sent to the relay node RN. Subsequently, the relay node RN carries out predetermined processing, such as reception processing of the received data and recoding processing. Here, the control information includes, for example, the frequency of an applied resource, modulation scheme, and coding scheme, which vary depending on the communication mode.

On the other hand, if the data is sent from the relay node RN to the user equipment $UE_1$ after the predetermined process delay by the relay node RN, the control information or the like, which represents a mode of communication from the relay node RN to the user equipment $UE_1$, is similarly stored in the head of the frame. The data is stored in the data area and then sent to the data area. In other words, the data sent from the base station BS to the relay node RN and the data sent from the relay node RN to the user equipment $UE_1$ have different pieces of control information because of their communication modes between the devices, while their data areas store and send the same data.

SUMMARY

According to one example of the embodiments, a communication method includes at a relay device, receiving first data from the base station, the first data including first control information that represents a first communication mode which is a mode of communication from the base station to the relay device, adding second control information to the received first data, the second control information representing a second communication mode which is a mode of communication from the relay device to the terminal device, and relaying second data to the terminal device, the second data including the first data added with the second control information; and at a terminal device, receiving the first data of the first communication mode sent from the base station to the relay device storing the first data in a buffer, performing reception processing on the second data based on the second control information included in the second data, performing reception processing on the first data based on the first control information included in the second data, and combining the first and second data on which the reception processings have been performed.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram illustrating an exemplary correspondence table for a modulation scheme and a coding rate according to the second embodiment;

FIG. 15 is a diagram illustrating an exemplary correspondence table for a communication mode used between the devices according to the second embodiment;

FIG. 22 is a diagram illustrating the flow of a process performed by the communication system according to the related technology; and FIG. 23 is a diagram illustrating an exemplary transmission/reception frame of the communication system according to the related technology.

DESCRIPTION OF EMBODIMENTS

The aforementioned related technology has a problem in that an improvement in reception characteristics of the communication system cannot be attained by a simple configuration thereof.

Specifically, the related communication system includes a user equipment UE with a comparatively high radio wave intensity from the base station BS among user equipments UE in the communication area of the relay node RN. Although the user equipment UE is capable of directly receiving the radio wave from the base station BS, the data to be sent and received is based on a communication mode suitable for the relay node RN and cannot be directly subjected to the reception processing in the user equipment UE. In other words, the related communication system cannot utilize the received data with a high radio wave frequency.

A technology of combining signals from a plurality of pathways requires a specific control for improving diversity effect in each of the defined devices. In other words, the technology of combining the signals from the plurality of pathways requires a complicated configuration to combine the signals from the respective pathways. As a result, the aforementioned related technology requires its complicated configuration to attain an improvement in reception characteristics of the communication system.

Therefore, any technology disclosed in the present application has been made in consideration of the aforementioned problem inherent to the related technology and intends to provide a communication method, a relay device, a terminal device, and a base station, which can improve the reception characteristics of a communication system with a simplified configuration. A technology for improving a diversity effect at the data-receiving end by combining a received signal directly received from the base station and a received signal received through a predetermined device is desirous.

Accordingly, any one of aspects of the communication method, the relay device, the terminal device, and the base station disclosed in the present application exerts an advantageous effect of enhancing the reception characteristics of the communication system with a simple configuration thereof.

Hereinafter, examples of the communication method, the relay device, the terminal device, and the base station disclosed in the present application will be described with reference to the attached drawings. However, the present invention is not limited to any of the examples described below.

Figure 1:
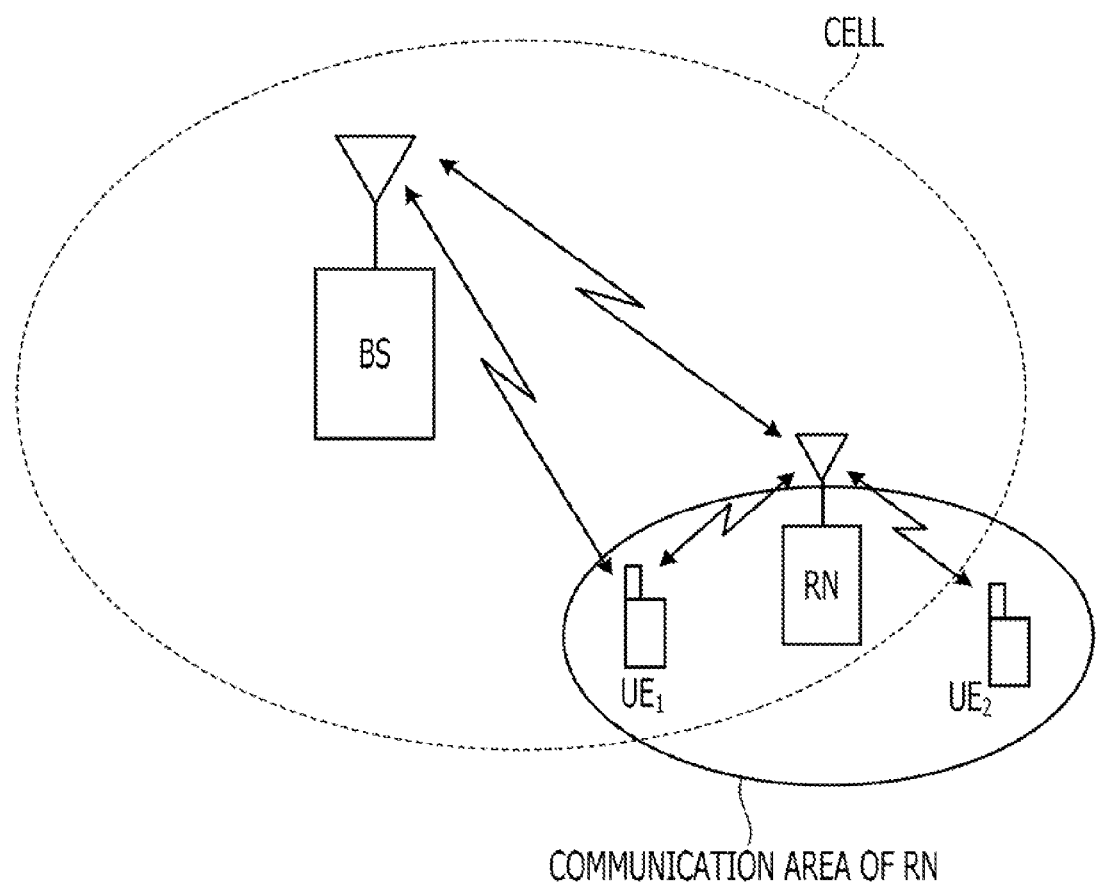
FIG. 1 is a diagram illustrating a configuration example of a communication system according to a first embodiment.

Referring now to FIG. 1, first, the configuration of a communication system according to a first embodiment will be described. FIG. 1 is a diagram illustrating an exemplary configuration of the communication system of the first embodiment. Here, in FIG. 1, BS represents a base station, RN represents a relay node as a relay device, and UE represents a user equipment as a terminal device.

As shown in FIG. 1, for example, the communication system of the first embodiment includes a base station BS, a relay node RN, a user equipment $UE_1$, and a user equipment $UE_2$. In addition, the relay node RN is included in a cell, the communication area of the base station and the user equipments $UE_1$ and $UE_2$ are included in the communication area of the relay node RN. It is noted that any of the user equipments UE (e.g., $UE_2$) is not always included in a cell, the communication area of the base station BS. Although the user equipment $UE_1$ is included in the communication area of the relay node RN, the user equipment $UE_1$ is in a state of being possible to receive data sent from the base station because of its location comparatively near the base station. Although the communication system shown in FIG. 1 includes the base station BS, the relay node RN, and two user equipments UE, a relay node RN having a communication area with a plurality of user equipments UE is present in the cell.

In the aforementioned configuration of the communication system, the relay node receives data including first control information representing a first communication mode, a mode of communication from the base station to the relay node, from the base station. More specifically, in a mode of communication from the base station BS to the relay node RN, the relay node RN receives data including first control information representing such a communication node from the base station BS. The term "mode of communication from the base station BS to the relay node RN" indicates mode information required for reception processing carried out in the relay node RN. In addition, the term "control information representing a communication mode from the base station BS to the relay node RN" includes the frequency of an applied resource, modulation scheme, and coding scheme in communication from the base station BS to the relay node RN.

On the other hand, at this time, a terminal device receives data which were transmitted from the base station to the relay device by a first communication mode and then stores the data in a predetermined buffer. More specifically, in the above exemplary configuration, the user equipment $UE_1$ receives data which were transmitted from the base station BS to the relay node RN by a communication mode which is used between the base station BS and the relay node RN and then performs buffering to store the received data into a buffer. However, the user equipment $UE_1$ which has received the data addressed to the relay node RN does not perform the reception processing of the received data at this time because there is no control information about the user equipment $UE_1$ in the received data.

Furthermore, the relay device adds second control information to the data received (which includes the first control information) in the data receiving operation above, where the second control information represents a second communication mode, a mode of communication from the relay node to a terminal device. More specifically, in the above example, the relay node RN that has received the data from the base station BS includes both first control information that represents a mode of communication from the relay node RN to the user equipment $UE_1$ and second control information that represents a mode of communication from the base station BS to the relay node RN to the received data.

On the other hand, the terminal device performs reception processing on the relay data, which has been relayed by the relay device in the second communication mode, based on the second control information included in the relay data. Then, the terminal device performs reception processing on the stored received data on the basis of the first control information included in the relay data. Subsequently, the terminal device combines the received data with the received relay data.

More specifically, in the above example, the user equipment $UE_1$ performs reception processing on the relay data, which has been relayed by the relay node RN in the mode of communication from the relay node RN to the user equipment $UE_1$, based on the control information that represents the mode of communication from the relay node RN to the user equipment $UE_1$. Then, the user equipment $UE_1$ detects that the control information that represents the mode of communication from the base station BS to the relay node RN, which is included in the relay data, is identical with the control information that for mode of communication from the base station BS to the relay node RN, which is included in the stored received data.

Then, the user equipment $UE_1$ performs reception processing on the buffered received data on the basis of the control information included in the relay data, which represents the mode of communication from the base station BS to the relay node RN. Subsequently, the user equipment $UE_1$ combines the relay data, which is already subjected to the reception processing, with the received data.

Figure 2:
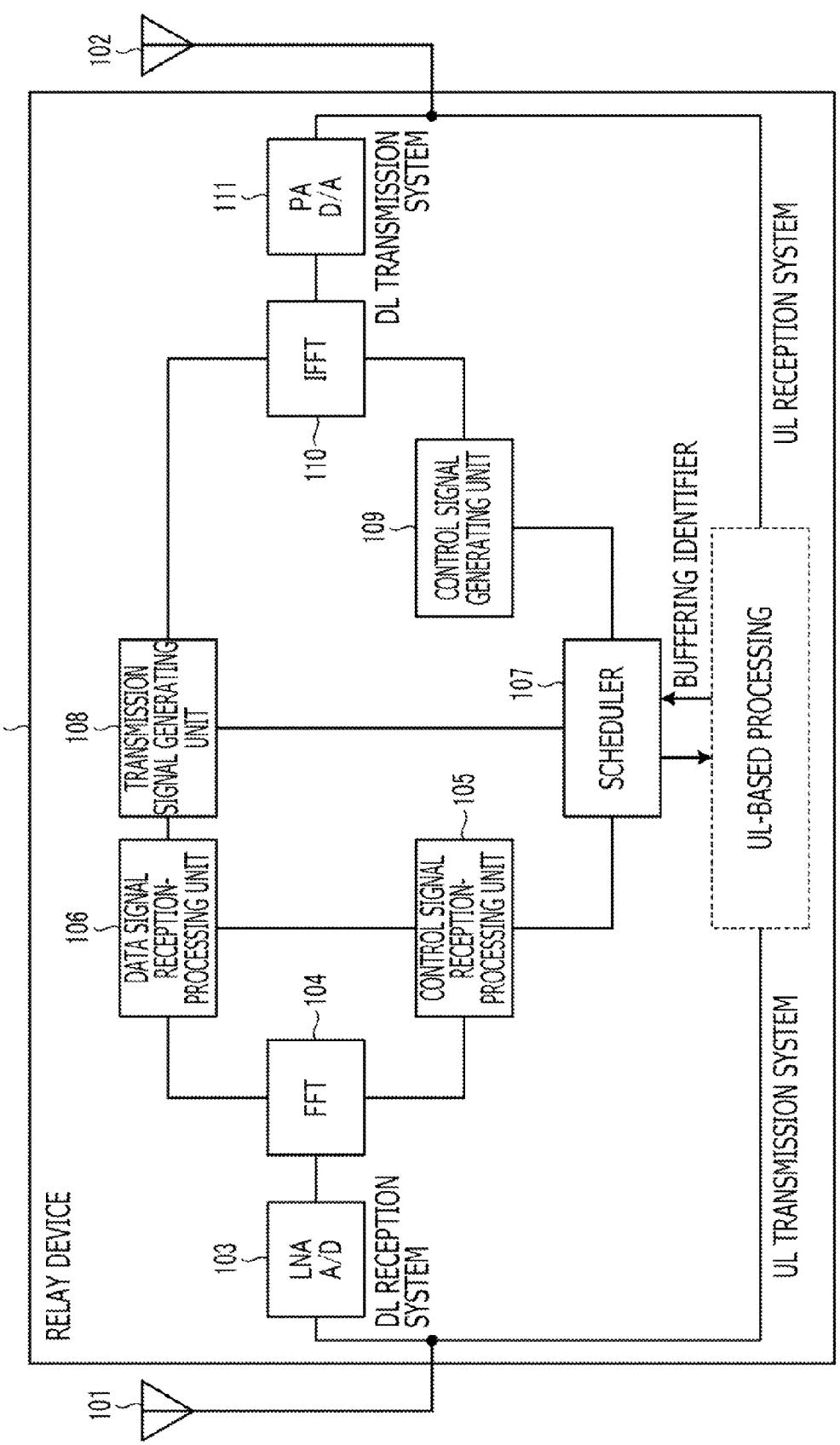
FIG. 2 is a diagram illustrating a configuration example of a relay device according to the first embodiment.

Referring now to FIG. 2, the configuration of the relay device according to the first embodiment will be described. FIG. 2 is a diagram illustrating a configuration example of a relay device according to the first embodiment. Here, the processing based on a downlink (DL) system will be mainly described with reference to FIG. 2.

As shown in FIG. 2, for example, the relay device 100 includes an antenna 101, an antenna 102, a low noise amplifier (LNA) A/D 103, and a fast Fourier transform (FFT) 104. In addition, for example, the relay device 100 further includes a control signal reception-processing unit 105, a data signal reception-processing unit 106, a scheduler 107, a transmission signal generating unit 108, and a control signal generating unit 109. For example, the relay device 100 further includes an inverse fast Fourier transform (IFFT) 110 and a power amplifier (PA) D/A 111. As a matter of convenience, the low noise amplifier (LNA) A/D 103 and the power amplifier (PA) D/A 111 are represented by different blocks in the figure, respectively. In practice, the LNA and the A/D are installed in the device as different analog circuits. Likewise, the D/A and the PA are also installed in the device as different analog circuits.

The antenna 101 receives traffic from the base station BS as reception using a DL band. It is noted that the antenna 101 performs not only DL-band reception but also uplink (UL)-band transmission. Alternatively, for example, the antenna 102 sends traffic to the user equipment UE as DL-band transmission. It is noted that the antenna 102 performs not only DL-band transmission but also UL-band reception. Furthermore, the antenna 101 and the antenna 102 may be functionally divided into one for DL-based transmission/reception and one for UL-based transmission/reception.

The LNA A/D 103 performs, for example, amplification of data received by the antenna 101 and analog-digital (AD) conversion thereof. In addition, for example, the FFT 104 performs the fast Fourier transform that detects the number of frequency components in a signal. After passing through the FFT 104, the data is divided into a data signal to be input in the data signal reception-processing unit 106 and a control signal to be input in the control signal reception-processing unit 105.

For example, the control signal reception-processing unit 105 performs reception processing of the control signal received from the FFT 104. Then, the data signal reception-processing unit 106 is notified of control information that represents a mode of communication from the base station to the relay device 100 is notified as information obtained by the reception processing. The information obtained from the reception processing performed by the control signal reception-processing unit 105 includes not only the control information that represents a mode of communication from the base station to the relay device 100 but also other pieces of information, such as a buffering identifier used in UL-based processing. These kinds of information can be managed by the scheduler 107.

Furthermore, for example, the data signal reception processing 106 performs reception processing on data, based on a data signal received from the FFT 104 and control information received from the control signal reception-processing unit 105. Furthermore, the data signal reception-processing unit 106 inputs data on which the reception processing has been completed, into the transmission signal generating unit 108.

The scheduler 107 manages various kinds of information for transmission/reception of data. For example, the scheduler 107 manages whether buffering is applied to each terminal device and then relays data to a relay destination when traffic reaches to the terminal device provided as a target to which the buffering is applied. The data relayed to the relay destination includes control information that represents a mode of communication between the base station and the relay device 100 and control information that represents a mode of communication between the relay device 100 and the terminal device.

Therefore, the scheduler 107 notifies the transmission signal generating unit 108 of two kinds of the control information: one representing the mode of communication between the base station and the relay device 100 and the other representing the mode of communication between the relay device 100 and the terminal device. Furthermore, the scheduler 107 notifies the control signal generating unit 109 of control information that represents a mode of communication between the relay device 100 and the terminal device. The determination whether buffering is applied to each terminal buffer will be described later.

For example, based on the data received from the data signal reception-processing unit 106 and two kinds of control information received from the scheduler 107, the transmission signal generating unit 108 generates relay data to be relayed to the terminal device provided as a relay destination and then inputs the relay data into the IFFT 110. At this time, the transmission signal generating unit 108 adds the control information that represents the mode of communication between the base station and the relay device 100 to the data.

For example, based on the control information received from the scheduler 107, or the control information that represents the mode of communication between the relay device 100 and the terminal device, the control signal generating unit 109 generates a control signal and then inputs the control signal into the IFFT 110. In addition, for example, the IFFT 110 receives the data input from each of the transmission signal generating unit 108 and the control signal generating unit 109 and then returns the data into a time signal, followed by inputting the time signal into the PA D/A 111. For example, the PA D/A 111 A/D-converts the signal received from the IFFT 110 and then amplifies the signal. Here, the FFT 104, the control signal reception-processing unit 105, the data signal reception-processing unit 106, the scheduler 107, the transmission signal generating unit 108, the control signal generating unit 109, and the IFFT 110 can be realized by, for example, a digital signal processor (DSP), an application-specific integrated circuit (ASIC), and a field programmable gate array (FPGA).

Furthermore, for example, in the UL-based processing, the traffic from the antenna 102 to the terminal device is received and the UL-based processing is then performed on the UL-based reception pathway. Thus, the data is sent from the antenna 101 to the base station on the UL-based transmission pathway. The procedure of the UL-based processing is opposite to the procedure of the DL-based processing.

Figure 3:
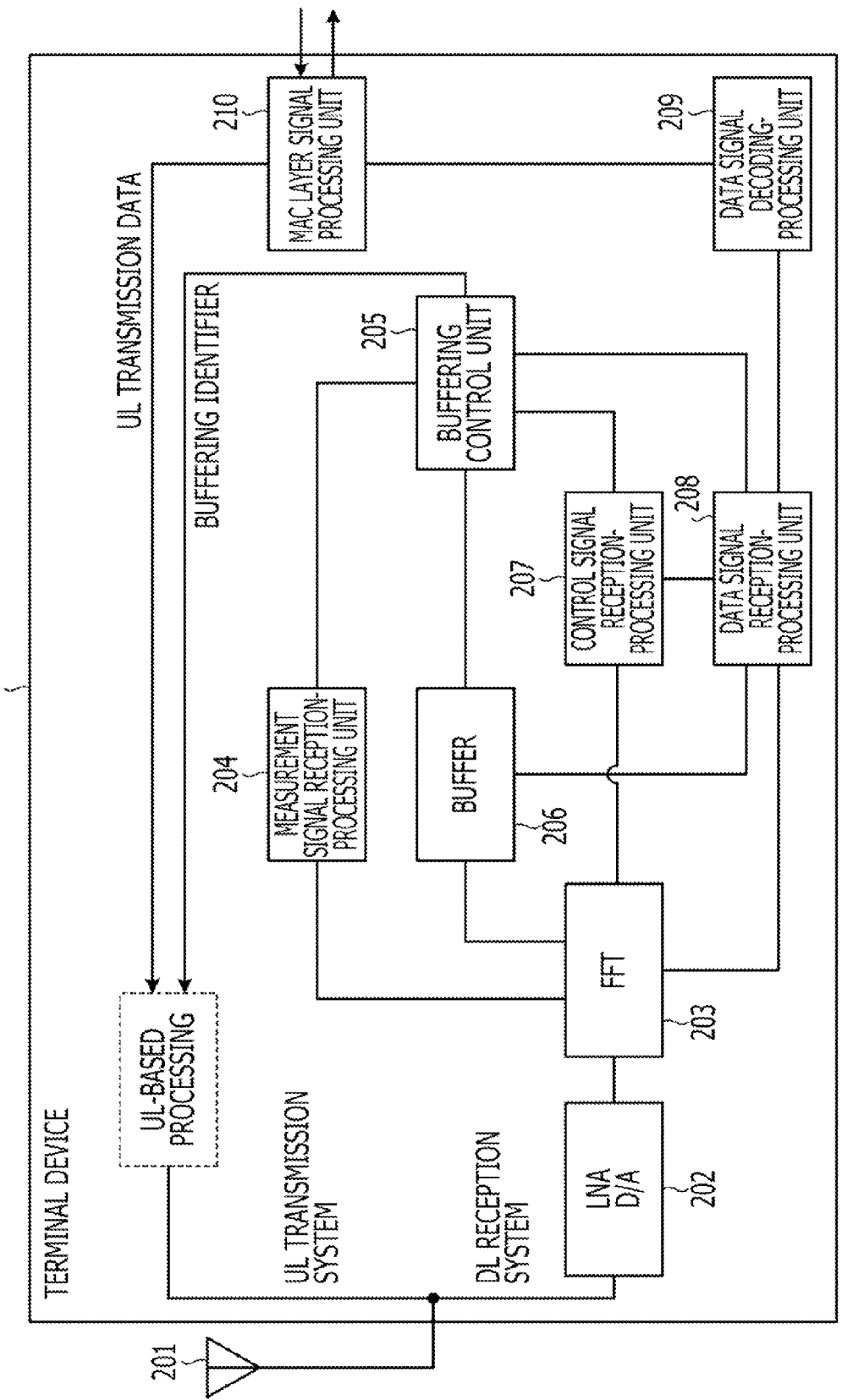
FIG. 3 is a diagram illustrating an exemplary configuration of a terminal device according to the first embodiment.

Referring now to FIG. 3, the configuration of the terminal device according to the first embodiment will be described. FIG. 3 is a diagram illustrating an exemplary configuration of a terminal device according to the first embodiment. Here, the processing based on a downlink (DL) system will be mainly described with reference to FIG. 3.

For example, as shown in FIG. 3, the terminal device 200 includes an antenna 201, a low noise amplifier (LNA) D/A 202, and a fast Fourier transform (FFT) 203. For example, the terminal device 200 further includes a measurement signal reception-processing unit 204, a buffering control unit 205, a buffer 206, a control signal reception-processing unit 207, and a data signal reception-processing unit 208. In addition, for example, the terminal device 200 includes a data signal decoding-processing unit 209 and a processing unit 210 for a media access control (MAC) layer signal. For convenience, the LNA D/A 202 is represented by one block in the figure. In practice, however, the LNA and the A/D are installed as different analog circuits in the device.

For example, the antenna 201 receives a DL signal sent from the base station or the relay device 100 and then inputs the DL signal into the LNA D/A 202. Then, for example, the LNA D/A 202 amplifies a signal received from the antenna 201 and then DA-converts the received signal. Furthermore, for example, the FFT 203 performs fast Fourier transform to separate individual signals.

The signal separated by the FFT 203 is a known signal for measurement received from the base station. Such a signal is then input into the measurement signal reception-processing unit 204. In addition, for example, the signal separated by the FFT 203 is each of the relay data received from the relay device 100 and the received data received from the base station. These pieces of data are input into the buffer 206. Furthermore, for example, the signal separated by the FFT 203 is a DL control signal to be input into the control signal reception-processing unit 207. Moreover, for example, the signal separated by the FFT 203 is a DL data signal to be input into a data signal reception-processing unit 208.

The measurement signal reception-processing unit 205 receives the known signal for measurement from the FFT 203 and then converts the signal into an electric power profile as a measurement result, followed by inputting the profile into the buffering control unit 205. The application of the electric power profile will be described later.

For example, the buffering control unit 205 controls the buffer 206 by input of a buffer control signal that represents an instruction of providing an appropriate frame (timing) for storing data or inputs a likelihood-combination instruction signal into the data signal reception-processing unit 208 in the reception processing. Furthermore, for example, the buffer 206 receives an instruction from the buffering control unit 205 and then outputs buffer data to the data signal reception-processing unit 208.

For example, the control signal reception-processing unit 207 receives a DL control signal from the FFT 203 and then inputs the DL control signal into the data signal reception-processing unit 208. For example, the control signal reception-processing unit 207 receives a DL control signal from the FFT 203 and then inputs relay frame-timing information from the DL control signal into the buffering control unit 205 the DL control signal into buffering control unit 205, where the relay frame-timing information represents which frame (timing) is a relay frame.

The data signal reception-processing unit 208 performs reception processing, for example, based on the DL data received from the FFT 203, the buffer data received from the buffer 206, and the likelihood combination instruction signal received from the buffering control unit 205. The reception processing by the data signal reception-processing unit 208 performs likelihood combination of the data received from the replay device 100 and the buffering data received from the base station. Subsequently, the likelihood information obtained as a processing result is input into the data signal decoding-processing unit 209.

The data signal decoding-processing unit 209 performs decoding processing of data based on the likelihood information received from the data signal reception-processing unit 208 and then inputs the result of the decoding processing into the MAC layer signal processing unit 210. In addition, for example, the MAC layer signal processing unit 210 further transfers the result of the decoding processing received from the data signal decoding-processing unit 209 to a higher order processing unit. Here, for example, the FFT 203, the measurement signal reception-processing unit 204, the buffering control unit 205, the buffer 206, the control signal reception-processing unit 207, the data signal reception-processing unit 208, the data signal decoding-processing unit 209, and the MAC layer signal processing unit 210 can be realized by a digital signal processor (DSP), an application-specific integrated circuit (ASIC), and a field programmable gate array (FPGA).

Figure 4:
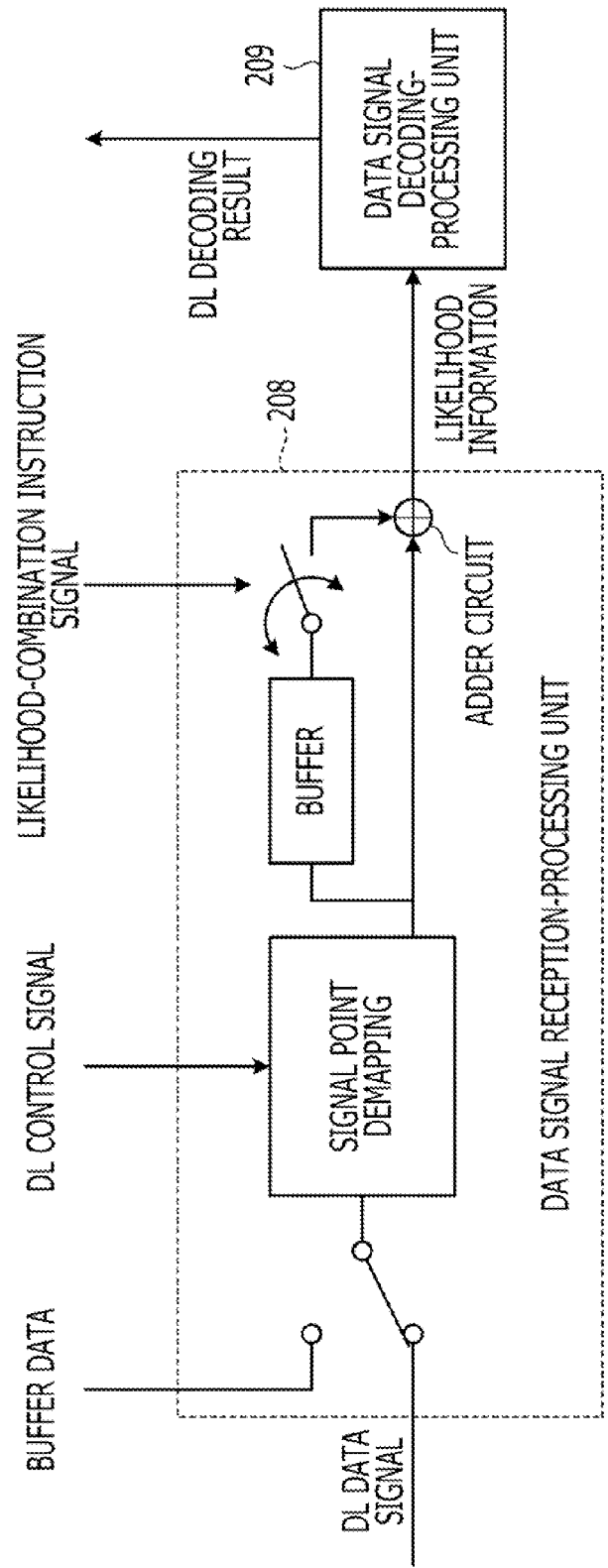
FIG. 4 is a diagram illustrating a detailed exemplary configuration of a data signal reception-processing unit.
Figure 5:
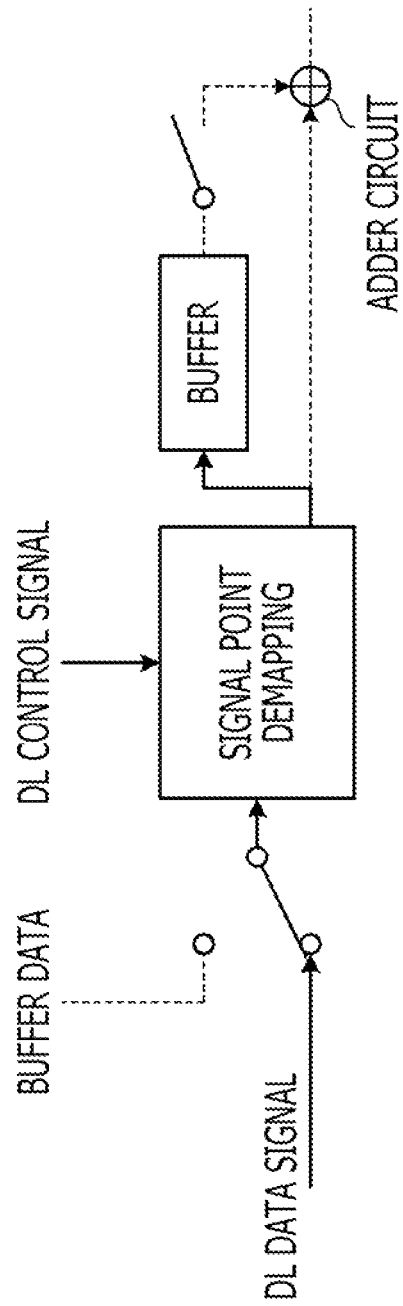
FIG. 5 is a diagram illustrating an example of storing a DL data signal into a buffer after demapping.
Figure 6:
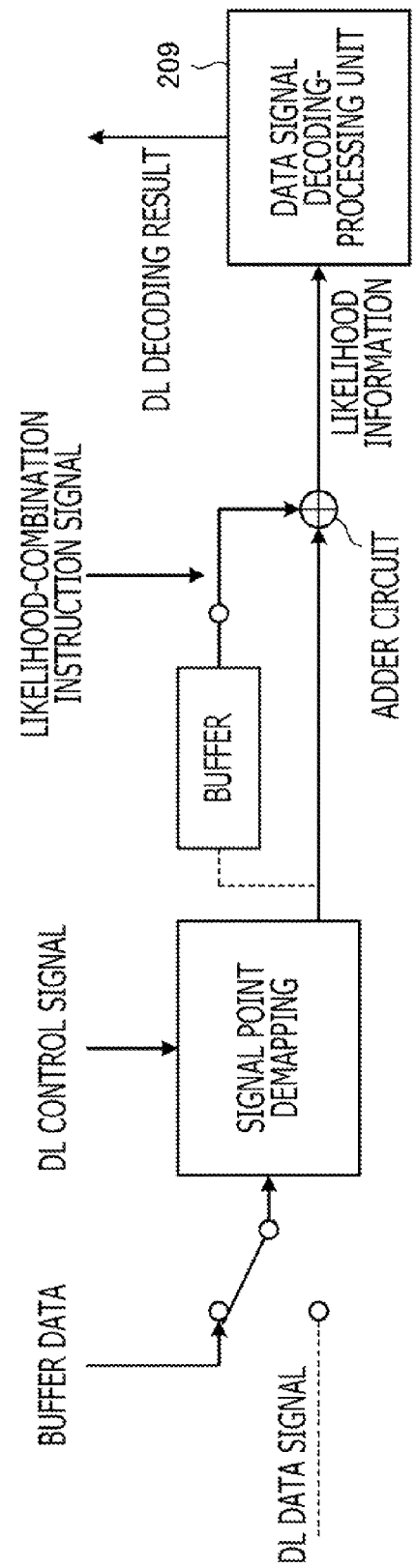
FIG. 6 is a diagram illustrating an example of demapping buffer data to perform likelihood combination.

Referring now to FIGS. 4, 5, and 6, the aforementioned data signal reception-processing unit 208 will be described in detail. FIG. 4 is a diagram illustrating an exemplary configuration of the data signal reception-processing unit 208. FIG. 5 is a diagram illustrating an example of storing a DL data signal into a buffer after demapping. FIG. 6 is a diagram illustrating an example of demapping buffer data to perform likelihood combination.

For example, as shown in FIG. 4, the data signal reception-processing unit 208 includes a signal point demapping, a buffer, an adder circuit, and a plurality of switches. Here, the buffer of the data signal reception-processing unit 208 is one different from the aforementioned buffer 206. As described above, the data signal reception-processing unit 208 is connected to the data signal decoding-processing unit 209.

Specifically, a switch is located on the upstream of the signal point demapping where a DL control signal input. The switch switches the DL data signal and the buffer data. Furthermore, both the buffer and the adder circuit are located on the downstream of the signal point demapping. In addition, another switch is located on the downstream of the buffer and connected to the adder circuit while receiving a likelihood combination directing signal.

In the aforementioned configuration, as shown in FIG. 5, the data signal reception-processing unit 208 performs signal-point demapping on a DL data signal, followed by storing the data into the data. Furthermore, as shown in FIG. 6, the data signal reception-processing unit 208 performs signal point demapping on the buffer data. Subsequently, as shown in FIG. 6, the data signal reception-processing unit 208 closes the switch located on the downstream of the buffer to carry out a likelihood combination in the adder circuit and then inputs the likelihood information obtained as a result of the combination into the data signal decoding-processing unit 209. Here, the data signal reception-processing unit 208 performs only the signal point demapping of the DL data signal in a usual manner if there is no received data (buffer data).

Figure 7:
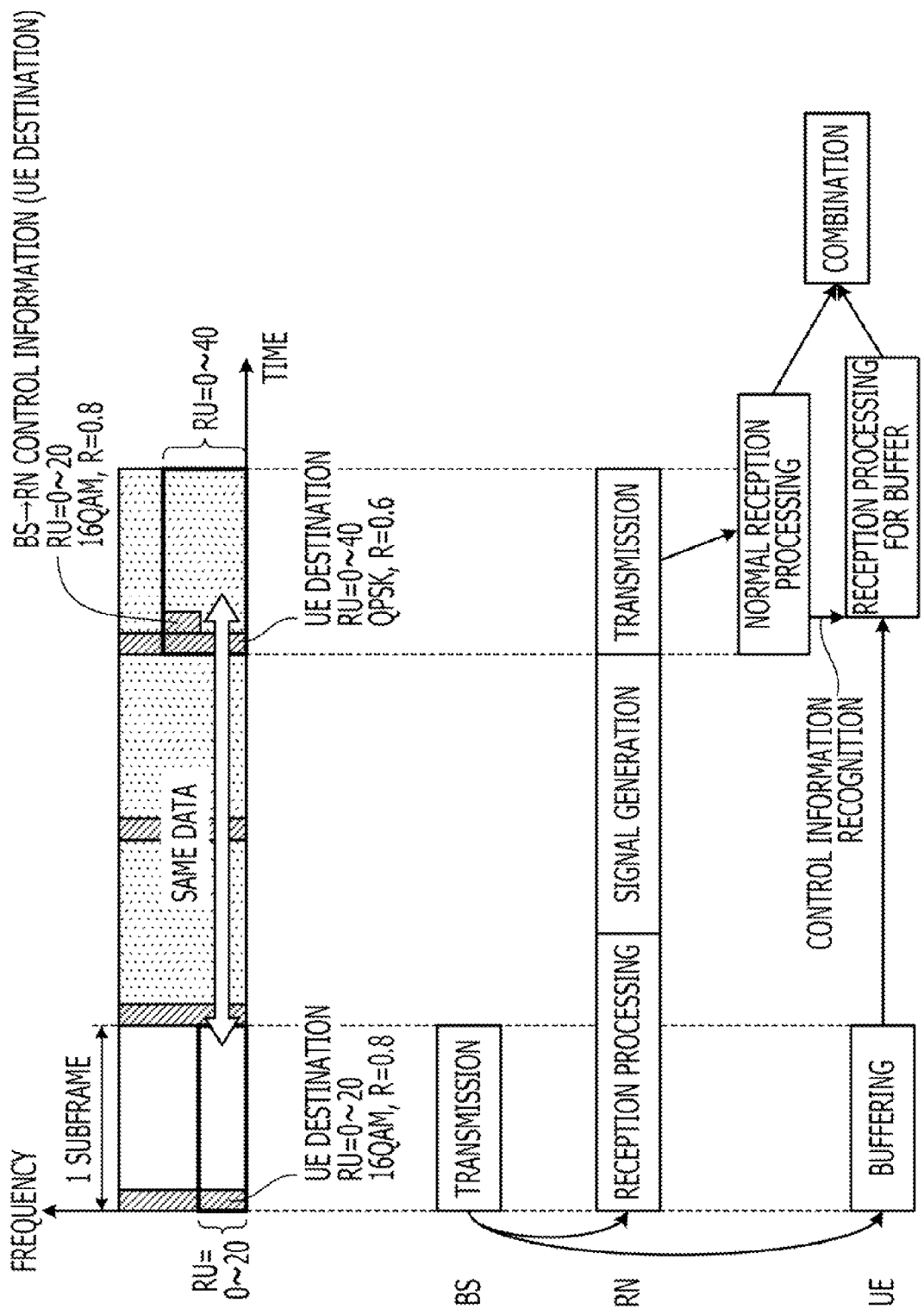
FIG. 7 is a diagram illustrating an exemplary transmission/reception frame and an exemplary process thereof performed in the communication system according to the first embodiment.

Referring now to FIG. 7, a transmission/reception frame and the processing performed in the communication system will be described. FIG. 7 is a diagram illustrating an exemplary transmission/reception frame and an exemplary process thereof performed in the communication system according to the first embodiment. In FIG. 7, BS represents a base station, RN represents a relay node as a relay device 100, and UE represents a user equipment as a terminal device 200.

As shown in FIG. 7, for example, first control information that represents a first mode of communication from the base station BS to the relay node RN includes RU (Resource Unit: position of use frequency)="0 to 20", 16 QAM (Quadrature Amplitude Modulation), and R (Rate: coding rate)="0.8". Then, the base station BS sends data containing the first control information to the relay node RN. On the other hand, at this time, the user equipment UE receives the data containing the first control information from the base station BS to the relay node RN and then performs buffering to store the data into the buffer.

In addition, the relay node RN performs reception processing based on the first control information to produce a signal of the data to be sent to the user equipment UE. Subsequently, the resource node RN sends the data to the user equipment UE, where the second control information that represents a second mode of communication from the relay node RN to the user equipment UE includes RU="0 to 40", QPSK (Quadrature Phase Shift Keying), and R="0.6"

Furthermore, in the data to be sent to the user equipment UE, a data area includes the first control information, which has been included at the time of data transmission from the base station BS to the relay node RN. FIG. 7 illustrates an example in which data is sent from the relay node RN to the user equipment UE after three frames of data transmission from the base station BS to the relay node RN. However, this timing is not limited to "after three frames" because this timing is sent after delay of processing, such as the reception processing or signal generation processing in the relay node.

Subsequently, the user equipment UE performs the reception processing of the data (normal reception processing) based on the second control information included in the data received from the relay node RN. In addition, the user equipment UE recognizes that the first control information in the data received from the relay node RN is identical to the control information in the buffered data and then performs reception processing of the buffered data.

The user equipment performs demapping processing on each piece of the data subjected to the reception processing to output two different kinds of likelihood data. Subsequently, the user equipment UE likelihood combines these two kinds of the likelihood data. Furthermore, for the processing timing of the reception processing of data received from the relay node and the reception processing of data received from the base station, these two kinds of the processing may be simultaneously performed or may be performed in order. In this case, the processing may be performed in no particular order.

Figure 8:
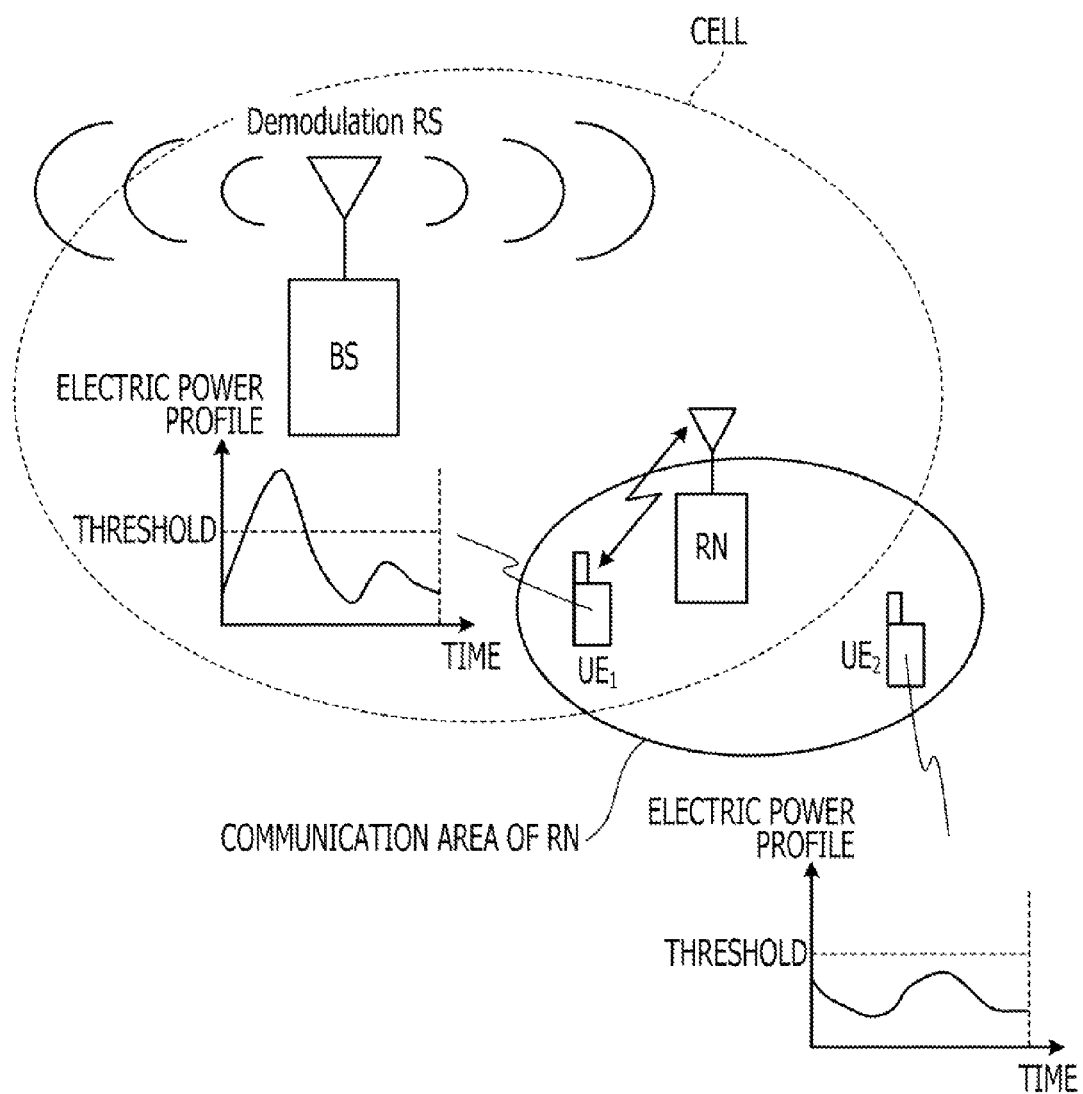
FIG. 8 is a diagram illustrating an example using an electric power profile according to the first embodiment.

Referring now to FIG. 8, the use of an electric power profile according to the first embodiment will be described. FIG. 8 is a diagram illustrating an example using an electric power profile according to the first embodiment. The term "electric power profile" means, for example, a result of measuring a reception level between a terminal device 200 and a base station by the terminal device 200. Hereinafter, a communication system including a base station BS, a relay node RN, a user equipment $UE_1$, and a user equipment $UE_2$ will be described as an example.

As shown in FIG. 8, for example, each of the user equipment $UE_1$ and the user equipment $UE_2$ measures a known signal, such as a demodulation reference (DR) signal, periodically sent from the base station BS. Then, the user equipment $UE_1$ obtains an electric power profile shown on the left side of FIG. 8 from the measurement result of the known signal. Alternatively, the user equipment $UE_2$ obtains an electric power profile shown on the right side of FIG. 8 from the measurement result of the known signal.

Subsequently, the user equipment $UE_1$ determines whether the reception level between the base station BS and the user equipment $UE_1$ is not less than a predetermined threshold. After that, if the reception level is not less than the predetermined threshold, then the user equipment $UE_1$ notifies the relay node RN of execution information representing that the processing of receiving data from the base station BS to the relay node RN is performed. Once the execution information is notified from the user equipment $UE_1$, the relay node RN adds second control information representing a mode of communication from the relay node RN to the user equipment $UE_1$ to the relay data to be sent to the user equipment $UE_1$.

Furthermore, the user equipment $UE_2$ determines whether the reception level between the base station BS and the user equipment $UE_2$ is not less than a predetermined threshold. After that, if the reception level is less than the predetermined threshold, then the user equipment $UE_2$ notifies the relay node RN of unexecution information representing that the processing of receiving data from the base station BS to the relay node RN is not performed. On the other hand, if the unexecution information is notified from the user equipment $UE_2$, then the relay node RN relays data to the user equipment $UE_2$, where the data is relay data from the remote node RN to the user equipment $UE_2$, or the data that only contains normal control information representing a mode of communication from the remote node RN to the user equipment $UE_2$.

The execution information and the unexecution information correspond to the aforementioned "buffering identifier". In the above description, the user equipment $UE_2$ is designed to notify the relay node RN of the unexecution information. Alternatively, the relay node RN may be notified of nothing. In this case, since the relay node RN is notified of nothing from the user equipment $UE_2$, the relay node RN relays only the normal control information from the relay node RN to the user equipment UE.

Figure 9:
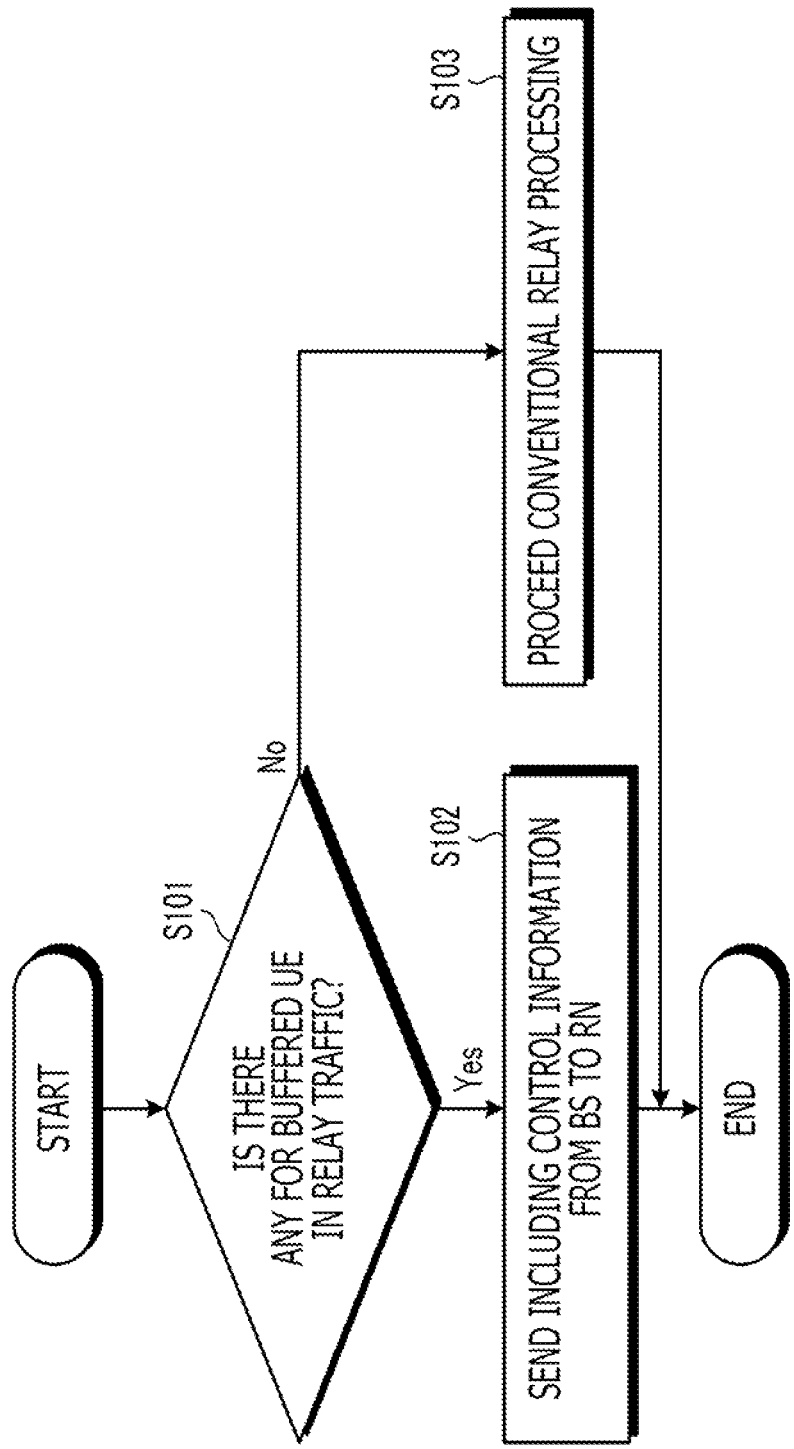
FIG. 9 is a flow chart illustrating an exemplary flow of relay processing according to the first embodiment.

Referring now to FIG. 9, the flow of the relay processing according to the first embodiment will be described. FIG. 9 is a flow chart illustrating an exemplary flow of relay processing according to the first embodiment. The term "relay processing" refers to processing performed by the relay device 100.

For example, as shown in FIG. 9, the relay device 100 determines whether there is a terminal device 200 for a buffered user equipment UE, which receives transmission data from the base station to the relay device 100, in a relay traffic relayed by the relay device 100 (S101). Furthermore, the relay device 100 determines the presence or absence of the buffered user equipment UE by identifying a buffering identifier (execution information) sent from the terminal device 200.

If there is the buffered user equipment UE (Yes in S101), then the relay device 100 sends data provided with control information representing a mode of communication from the base station to the relay node 100 to the terminal device 200 (S102). On the other hand, if there is no buffered user equipment UE (No in S101), then the relay device 100 acts as a related relay device to send data only containing control information representing a mode of communication from the relay device 100 to the terminal device 200 (S103).

Figure 10:
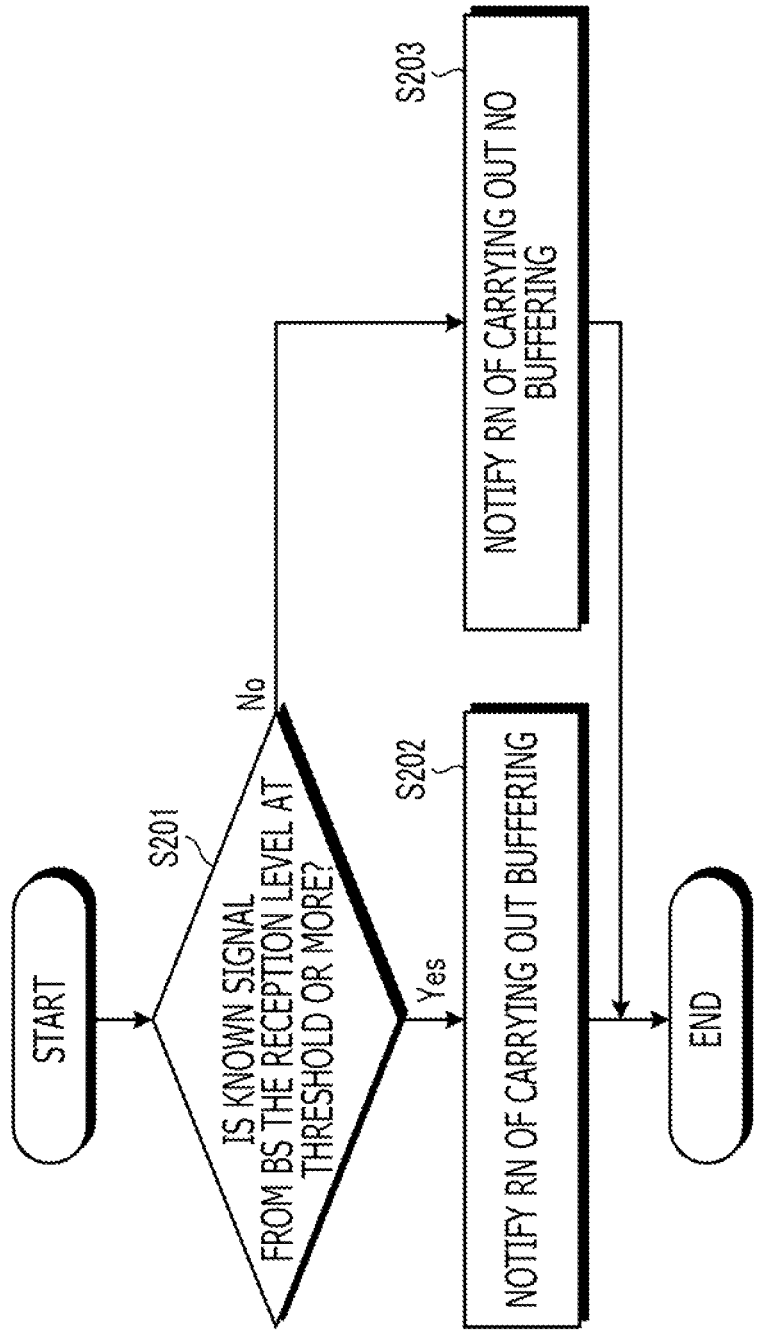
FIG. 10 is a flowchart illustrating an exemplary flow of notice processing according to the first embodiment.

Referring now to FIG. 10, the flow of notification processing according to the first embodiment will be described. FIG. 10 is a flowchart illustrating an exemplary flow of notification processing according to the first embodiment. The term "notification processing" refers to processing to notify the relay device 100 of whether buffering is allowed, based on an electric power profile obtained by the terminal device 200.

For example, as shown in FIG. 10, the terminal device 200 determines whether a reception level is not less than a predetermined threshold on the basis of the electric power profile obtained from the reception level of a known signal periodically sent from the base station (S201). Furthermore, if the reception level has a predetermined strength, then a peak appears in the electronic power profile.

Furthermore, if the reception level is not less than a predetermined threshold (Yes in S201), then the terminal device 200 receives the data transmitted from the base station to the relay device 100 and notifies the relay device 100 of carrying out buffering of the received data (S202). Furthermore, the information notified to the relay node 100 is a buffering identifier (execution information).

On the other hand, if the reception level is less than the predetermined level (No in S201), then the relay device 100 is notified that the buffering is not performed (S203). Furthermore, the information notified to the relay node 100 is a buffering identifier (unexecution information). Alternatively, the terminal device 200 may not notify the relay device 100 when the terminal device 200 does not perform the buffering.

Figure 11:
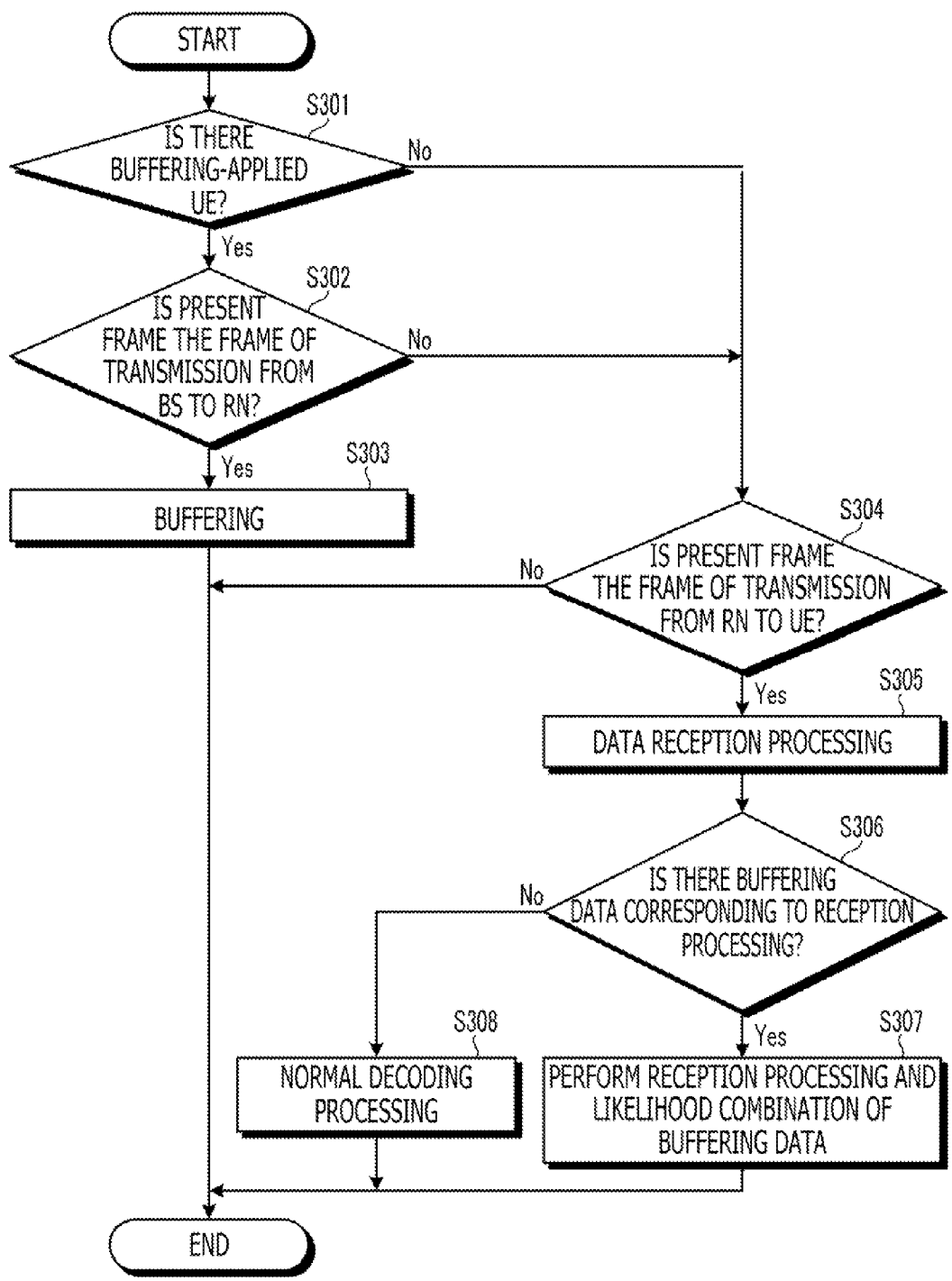
FIG. 11 is a flowchart illustrating an exemplary flow of reception processing performed by a terminal device according to the first embodiment.

Referring now to FIG. 11, the flow of reception processing of the terminal device 200 according to the first embodiment will be described. FIG. 11 is a flowchart illustrating an exemplary flow of reception processing of the terminal device 200 according to the first embodiment.

As shown in FIG. 11, for example, the terminal device 200 determines whether the terminal device 200 itself is a user equipment UE subjected to the buffering (S301). If the terminal device 200 is the user equipment UE subjected to the buffering (Yes in S301), then the terminal device 200 determines whether a frame at the present timing is a frame from the base station to the relay device 100 (S302).

Subsequently, if the present frame is a frame from the base station to the terminal device 200 (Yes in S302), then the terminal device 200 receives data sent from the base station to the relay device 100 and performs buffering to store the data into the buffer (S303).

Furthermore, if the terminal device 200 is not a user equipment UE subjected to the buffering (No in S301), then the terminal device 200 determines whether the frame at the present timing is a frame from the relay device 100 to the terminal device 200 (S304). Furthermore, if the present frame is not a frame from the base station to the relay device 100 (No in S302), then the terminal device 200 determines whether the frame at the present timing is a frame from the relay device 100 to the terminal device 200 (S304).

Furthermore, if the present frame is a frame from the relay device 100 to the terminal device 200 (Yes in S304), then the terminal device 200 performs the reception processing on the relay data received from the relay device 100 (S305). Furthermore, the terminal device 200 terminates the processing when the present frame is not a frame from the relay device 100 to the terminal device 200 (No in S304).

Subsequently, the terminal device 200 determines whether there is buffering data corresponding to the reception processing based on the control information in the relay data received from the relay device 100 and the control information in the received data stored in the buffer (S306). Subsequently, if there is buffering data corresponding to the reception processing (Yes in step S306), then the terminal device 200 performs the reception processing on buffering data and also performs likelihood combination of the received data and the relay data in addition to performing the reception processing on the buffering data (S307).

Furthermore, if there is no buffering data corresponding to the reception processing (No in S306), then the terminal device 200 performs normal decoding processing (S308). However, the normal decoding processing is performed because the terminal device 200 which is not a user equipment UE subjected to the buffering in the processing at step S301 leads to "No in S306" in the processing at S303.

As described above, the communication system sends control information which is required for performing the reception processing on data received from the base station by the terminal device. In this case, the control information is included in relay data, which is relayed by the relay apparatus, and then transmitted. Therefore, an increase in reception characteristics can be attained by a simplified configuration of the communication system.

Furthermore, the communication system performs likelihood combination in the terminal device having a sufficient reception level between the base station and the terminal device. Thus, an improvement in receiving characteristics can be attained in comparison with a case in which data with a large noise level is used in likelihood composition.

Incidentally, the above first embodiment has been described so that the data area includes control information to be added in transmission of relay data from the relay device 100 to the terminal device 200. In the following description, the definition portion of the control information included in the relay data is extended and the control information to be added to the relay data is included in the extended definition portion.

Figure 12:
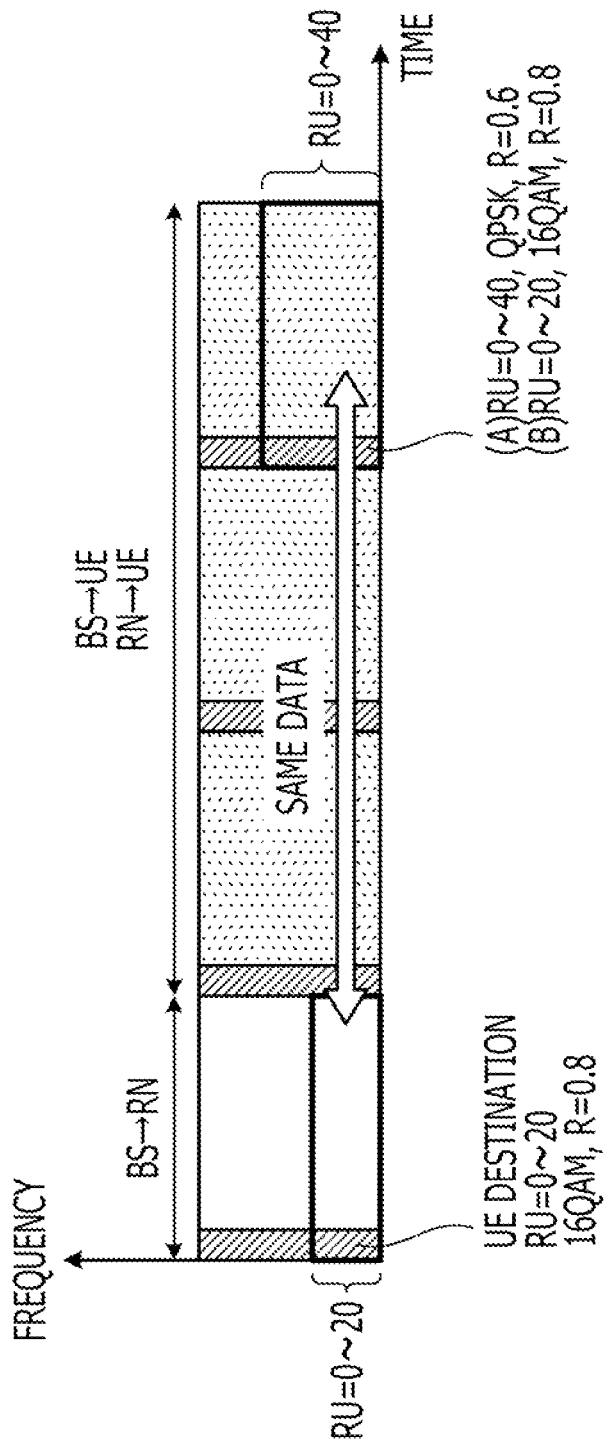
FIG. 12 is a diagram illustrating an example of an extended definition of control information according to a second embodiment.

Referring now to FIG. 12, an example of an extended definition of control information according to a second embodiment will be described. FIG. 12 is a diagram illustrating an example of an extended definition of control information according to a second embodiment.

For example, as shown in FIG. 12, in an event of extending the definition of control information, a communication mode (A) is shown. In contrast, a communication mode (B) is only shown as a difference between the communication modes (A) and (B). Alternatively, in an event of extending the definition of control information, if there is a frequency resource area which is not used at the same timing, the communication mode (B) is described in this unused frequency resource area to describe the position of (B) at the part of (A).

In other words, in an event of extending the definition of control information, control information for describing two different communication modes, one from a base station to a relay device 100 and the other from the relay device 100 to a terminal device 200, it is preferable to compress the volume of information to be described.

Figure 13:
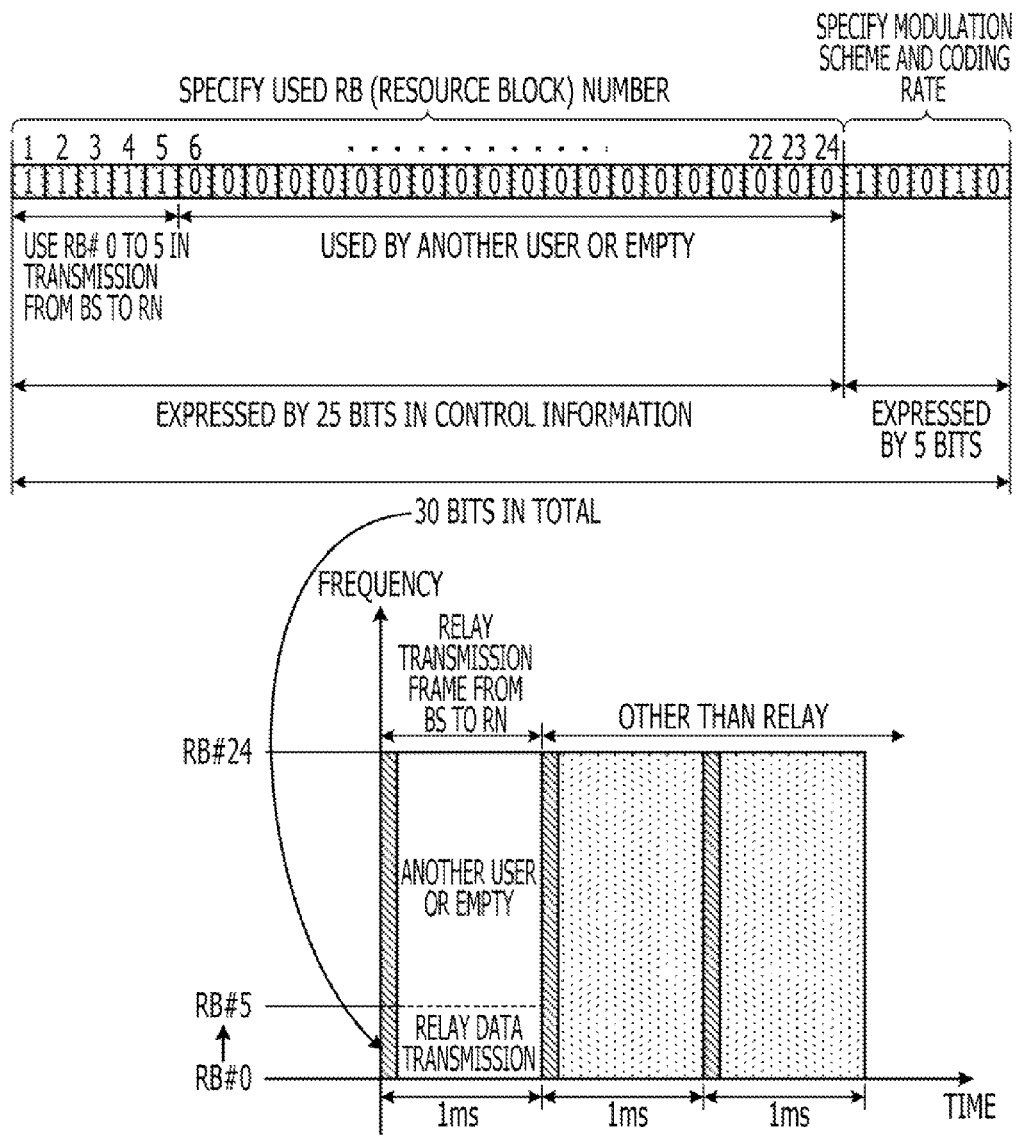
FIG. 13 is a diagram illustrating an example of an extended definition of control information according to a second embodiment.

Referring now to FIG. 13 and FIG. 14, an example of extending the definition of control information according to the second embodiment will be described. FIG. 13 is a diagram illustrating an example of an extended definition of control information according to the second embodiment. FIG. 14 is a diagram illustrating an exemplary correspondence table for a modulation scheme and a coding rate according to the second embodiment. Hereinafter, an example in which a LTE system with a bandwidth of 5 MHz, or 25 RB (Resource Block: 1 RB includes 12 sub-carriers) is used will be described.

As shown in FIG. 13, for example, to relay data from the base station BS to the relay node RN using downlink (DL), the relay is performed using RB #0 to 5. In addition, a control information portion included in the head of the frame includes bits (25 bits) that represent information about RB to be used and so on. Furthermore, bits (5 bits) that specify both a modulation scheme and a coding rate are included in the backside of the use RB definition.

In FIG. 13, 5 bits that specify both the modulation scheme and the coding rate are "10010". Thus, it represents that a modulation scheme and a coding rate defined by the number, "18 (=10010)", listed in a table shown in FIG. 14 are shown. In other words, the table shown in FIG. 14 represents "number" corresponding to the bit portion that specifies the modulation scheme and the coding rate shown in FIG. 13, and also represents the relation between the applicable "modulation scheme" and the applicable "coding rate". Furthermore, the correspondence table shown in FIG. 14 does not describe the direct value of the coding rate. Although the value related to the coding rate is stored, it is described as a value of the coding rate for the sake of simplicity in description.

Referring now to FIG. 15, an example in which an increase in number of bits of control information is prevented will be described. FIG. 15 is a diagram illustrating an exemplary correspondence table for a communication mode used between the devices according to the second embodiment.

As an example of preventing an increase in number of bits of control information, as shown in FIG. 15, the corresponding communication mode is selected from a table where a relation between a mode of communication from the base station BS to the remote node and a communication from the remote node to the user equipment UE is previously listed. For example, the relation table shown in FIG. 15 includes "Index" where numbers defined in this table are listed, "Communication mode from BS to RN" where a mode of communication from the relay node RN to the user equipment UE is used as a standard, "Number of bits used", and "Example of bit arrangement".

In other words, the user equipment UE recognizes one communication mode (e.g., communication mode from RN to UE) and then selects the subsequent index to recognize another communication mode (e.g., communication mode from BS to RN). Furthermore, when completely changing the communication mode, as shown in FIG. 15, "Index 7" allows the user to select another communication mode without limitation. In a communication with a large amount of buckets, however, it is considered that the use of "Index 7" is low as compared with the use of other indexes 1 to 6

As described above, the communication system stores control information, which is used for performing the reception processing on data received from the base station by the terminal device, in the definition part of extended control information included in relay data relayed by the relay device and then sends the stored data. As a result, the communication system can avoid a wasteful data area caused by partial occupation of the data area.

In the above first and second embodiments, it has been described that the control information is stored in the data area or the control information area in one frame. Hereinafter, an event in which one frame is divided and fixed for every RN will be described.

Figure 16:
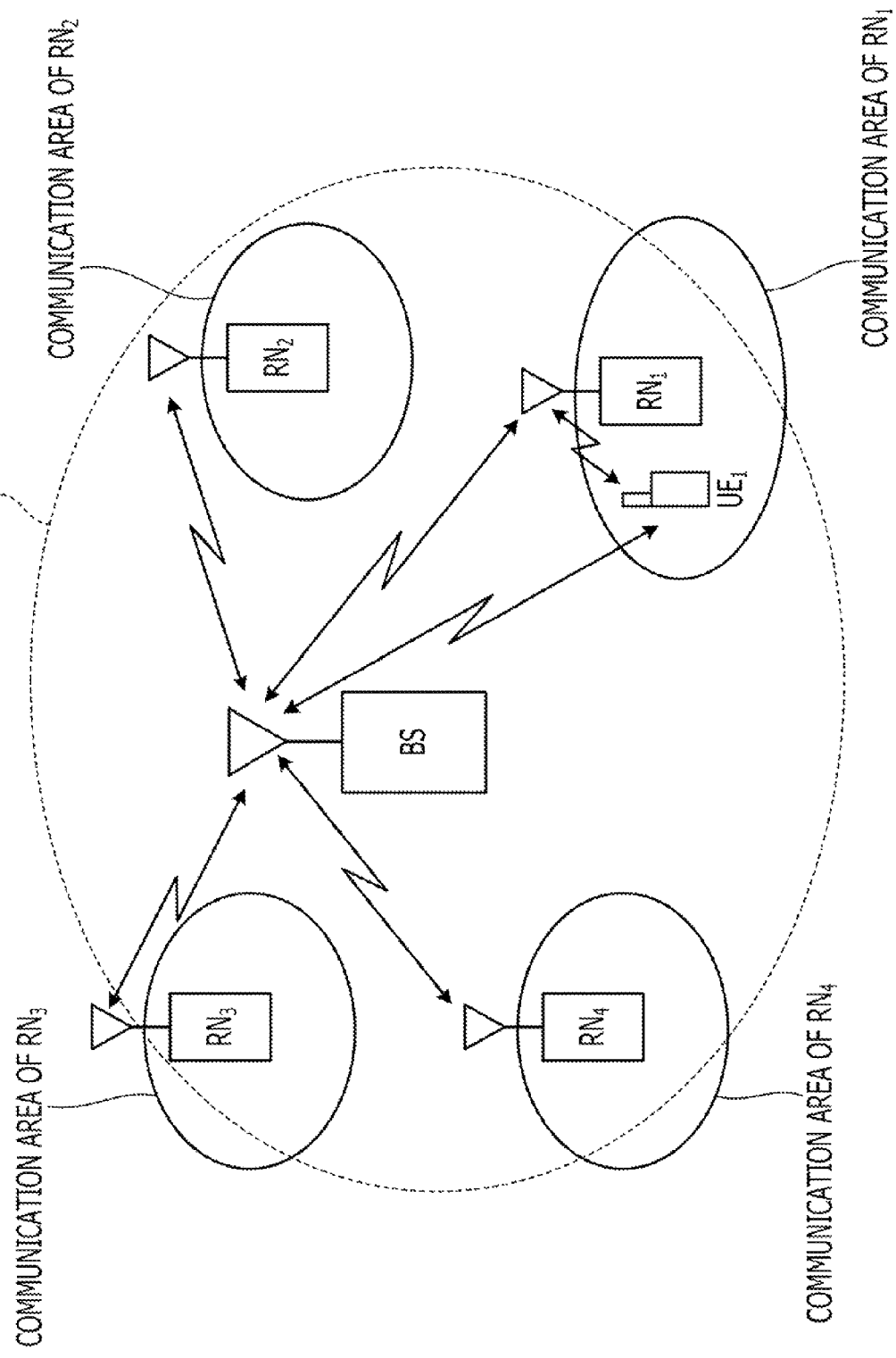
FIG. 16 is a diagram illustrating an exemplary configuration of the communication system according to a third embodiment.

Referring now to FIG. 16, an exemplary configuration of a communication system according to third embodiment will be described. FIG. 16 is a diagram illustrating an exemplary configuration of the communication system according to the third embodiment. In FIG. 16, BS represents a base station, RN (each of $RN_1$ to $RN_4$) represents a relay node as a relay device, and UE ($UE_1$) represents a user equipment as a terminal device.

As shown in FIG. 16, for example, the communication system of the third embodiment includes a base station BS, relay nodes $RN_1$ to $RN_4$, and a user equipment $UE_1$. The relay nodes $RN_1$ to $RN_4$ are included in a cell which is the communication area of the base station. In addition, the user equipment $UE_1$ is included in the communication area of the relay node $RN_1$. However, the user equipment UE is not always included in the cell, the communication area of the base station BS. Although the user equipment $UE_1$ is included in the communication area of the relay node $RN_1$, the user equipment $UE_1$ is in a state of being possible to receive data sent from the base station BS because of its location comparatively near the base station. Although the communication system is illustrated as one having one base station BS, four relay nodes RN, and one user equipment UE in FIG. 16, the configuration of the communication system is not limited thereto.

In the above configuration, for example, in a communication mode from the base station BS to the relay node RN, the relay node $RN_1$ receives data including control information representing such a communication node from the base station BS. The term "communication mode from the base station BS to the relay node $RN_1$" means mode information required for reception processing carried out in the relay node $RN_1$. In addition, the term "control information representing a communication mode from the base station BS to the relay node $RN_1$" includes the frequency of an applied resource, modulation scheme, and coding scheme in communication from the base station BS to the relay node $RN_1$.

Figure 17:
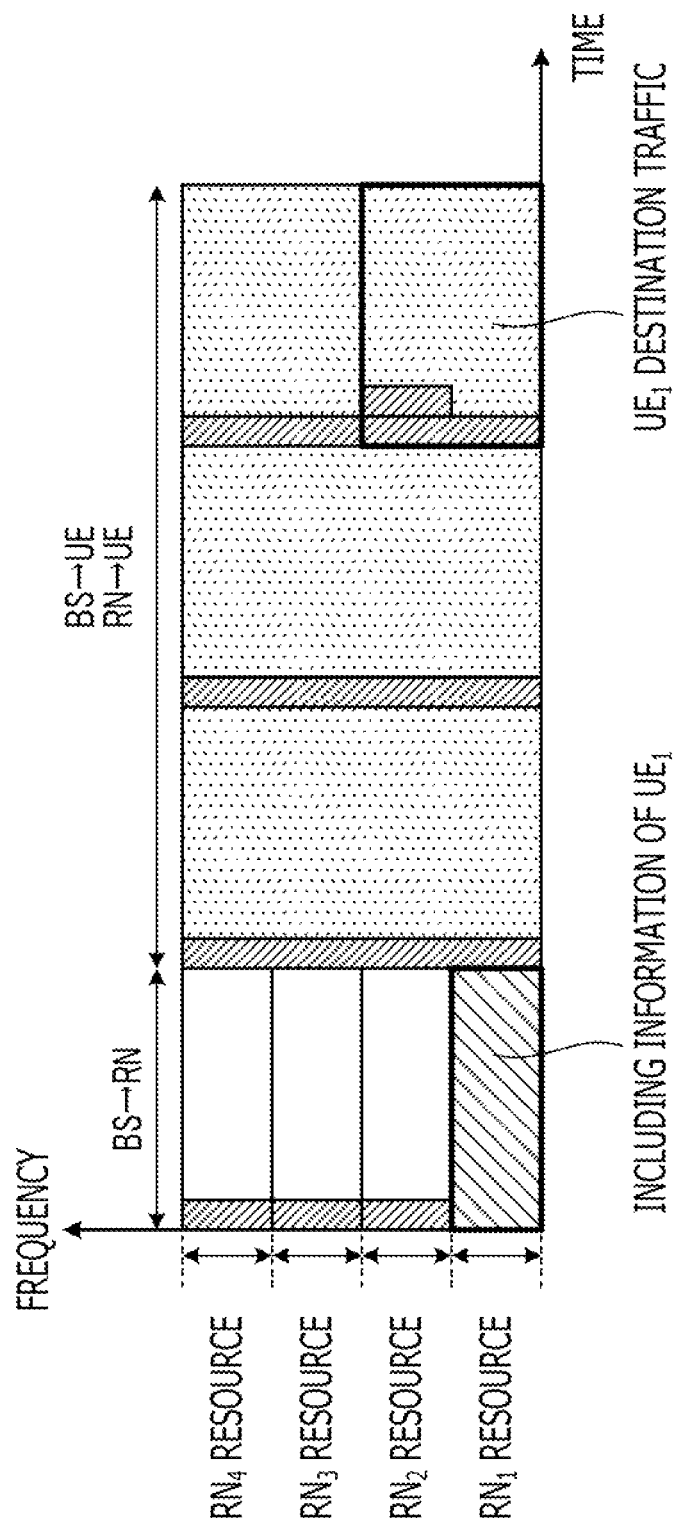
FIG. 17 is a diagram illustrating an exemplary transmission/reception frame according to the third embodiment.

Referring now to FIG. 17, a transmission/reception frame according to the third embodiment will be described. FIG. 17 is a diagram illustrating an exemplary transmission/reception frame according to the third embodiment.

As shown in FIG. 17, for example, if there are four relay nodes RN in one cell, the transmission/reception frame of the third embodiment is constructed so that the frequency regions of the respective resources used for the data relay of each relay node RN and the base station BS are assigned in a fixed manner. Specifically, as shown in FIG. 17, in one frame from the base station BS to the resource node RN, four different frequency regions are assigned to a $RN_1$ resource, a $RN_2$ resource, a $RN_3$ resource, and a $RN_4$ resource in the cell of the base station BS in a fixed manner. Therefore, the data sent from the base station BS to the relay node $RN_1$ can be sent after storing the data containing the control information of the user equipment $UE_1$ into the $RN_1$ resource.

Referring back to the description of FIG. 16, for example, the user equipment $UE_1$ receives data sent from the base station BS to the relay node $RN_1$ using a mode of communication from the base station BS to the relay node $RN_1$ and then performs buffering to store only the data corresponding to the $RN_1$ resource into a buffer. However, the user equipment $UE_1$ which has received the data addressed to the relay node $RN_1$ does not perform the reception processing of the received data at this time because there is no control information about the user equipment UE in the received data.

Furthermore, for example, the remote node adds control information that represents a mode of communication between the relay node $RN_1$ and the user equipment $UE_1$ to the received data as the received data already included control information that represents a mode of communication between the base station BS and the relay node $RN_1$ and transmits the received data to the user equipment $UE_1$.

Alternatively, the user equipment $UE_1$ performs reception processing on the relay data, which has been relayed by the relay node in the mode of communication from the relay node $RN_1$ to the user equipment $UE_1$, based on the control information that represents the mode of communication from the relay node $RN_1$ to the user equipment $UE_1$. Then, the user equipment $UE_1$ detects that the control information that represents the mode of communication from the base station BS to the relay node $RN_1$, which is included in the relay data, is identical with the control information that the mode of communication from the base station BS to the relay node $RN_1$, which is included in the received data.

Then, the user equipment $UE_1$ performs reception processing on the buffered received data on the basis of the control information included in the relay data, which represents the mode of communication from the base station BS to the relay node $RN_1$. Subsequently, the user equipment $UE_1$ combines the relay data, which is already subjected to the reception processing, with the received data.

As described above, the communication system previously assigns resources to the corresponding relay devices in the cell and thus only the resource data corresponding to the relay device is buffered. Therefore, the amount of buffer in the terminal device can be reduced.

In the above first to third embodiments, the combination processing in which the received data and the relay data are simply added to each other has been described. Hereinafter, an event of determining weighting applied to the combination between the received data and the relay data on the basis of the electric power profile will be described.

Figure 18:
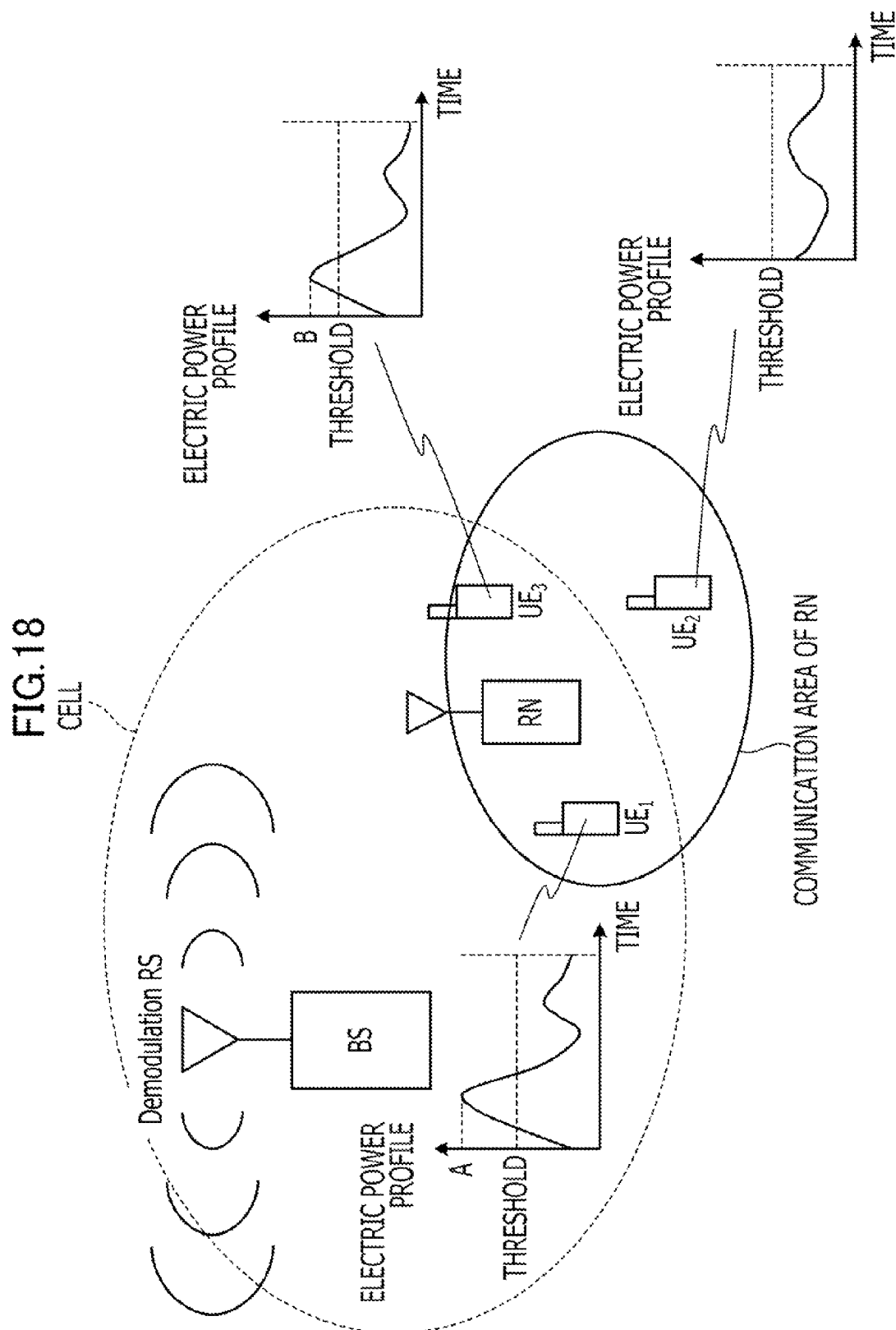
FIG. 18 is a diagram illustrating an example using an electric power profile according to a fourth embodiment.

Referring now to FIG. 18, the use of an electric power profile according to a fourth embodiment will be described. FIG. 18 is a diagram illustrating an example using an electric power profile according to the fourth embodiment. Hereinafter, a communication system including a base station BS, a relay node RN, and user equipments $UE_1$ to $UE_3$ will be described as an example.

For example, as shown in FIG. 18, the user equipments $UE_1$ to $UE_3$ measure the known signals periodically sent from the base station BS. Then, the user equipment $UE_1$ obtains an electric power profile shown on the left side of FIG. 18 from the measurement result of the known signal. The user equipment $UE_2$ obtains an electric power profile shown on the lower right side of FIG. 18 from the measurement result of the known signal. The user equipment $UE_3$ obtains an electric power profile shown on the upper right side of FIG. 18 from the measurement result of the known signal.

Subsequently, each of the user equipments $UE_1$ to $UE_3$ determines whether the reception level between the base station BS and each of the user equipments $UE_1$ and $UE_3$ is not less than a predetermined threshold. After that, if the reception level is not less than the predetermined threshold, then each of the user equipments $UE_1$ and $UE_3$ notifies the relay node RN of execution information (buffering identifier) representing that the processing of receiving data from the base station BS to the relay node RN is performed. On the other hand, if the execution information is notified from each of the user equipments $UE_1$ and $UE_3$, then the relay node RN adds control information representing a mode of communication from the base station BS to the relay node RN to the relay data from the base station BS to each of the user equipments $UE_1$ and $UE_3$.

Furthermore, the user equipment $UE_2$ determines whether the reception level between the base station BS and the user equipment $UE_2$ is not less than a predetermined threshold. After that, if the reception level is less than the predetermined threshold, then the user equipment $UE_2$ notifies the relay node RN of unexecution information (buffering identifier) representing that the processing of receiving data from the base station BS to the relay node RN is not performed. On the other hand, if the unexecution information is notified from the user equipment $UE_2$, then the relay node RN relays data to the user equipment $UE_2$, where the data is relay data from the remote node RN to the user equipment $UE_2$, or the data that only contains normal control information representing a mode of communication from the remote node RN to the user equipment $UE_2$. In the above description, the user equipment $UE_2$ is designed to notify the relay node of the unexecution information. Alternatively, the user equipment $UE_2$ may notify the relay node RN of nothing. In this case, since the relay node RN is notified of nothing from the user equipment $UE_2$, the relay node RN relays only the normal control information from the relay node RN to the user equipment $UE_2$.

Here, each of the user equipment $U_1$ and the user equipment $UE_3$, which has notified its buffering identifier to the relay node RN, weighs the likelihood combination on the basis of the amplitude value of the electric power profile. More specifically, as shown in FIG. 18, the user equipment $UE_1$ is provided with an amplitude value of "A" and the user equipment $UE_3$ is provided with an amplitude value of "B" (A>B). Thus, the likelihood combination is performed such that the likelihood combination in the user equipment $UE_1$ is weighed one time and the likelihood combination in the user equipment $UE_3$ is weighed 0.7 times. In other words, if the electric wave level from the base station BS becomes small, then the ratio of noise to signal increases. Thus, data with large noise can be prevented from being combined.

As described above, the communication system enlarges the ratio of the likelihood combination of the terminal device having a larger reception level between the base station and the terminal device and to decrease the ratio of the likelihood combination of the device having a smaller reception level.

The embodiments of the wireless device, the wireless communication system, and the wireless communication method disclosed in the present application have been described. In addition to the configurations of the aforementioned embodiments, various different configurations may be applied to those disclosed in the present application. Thus, other different embodiments will be described with respect to (1) the time of uplink and (2) the configuration of each device.

Figure 19:
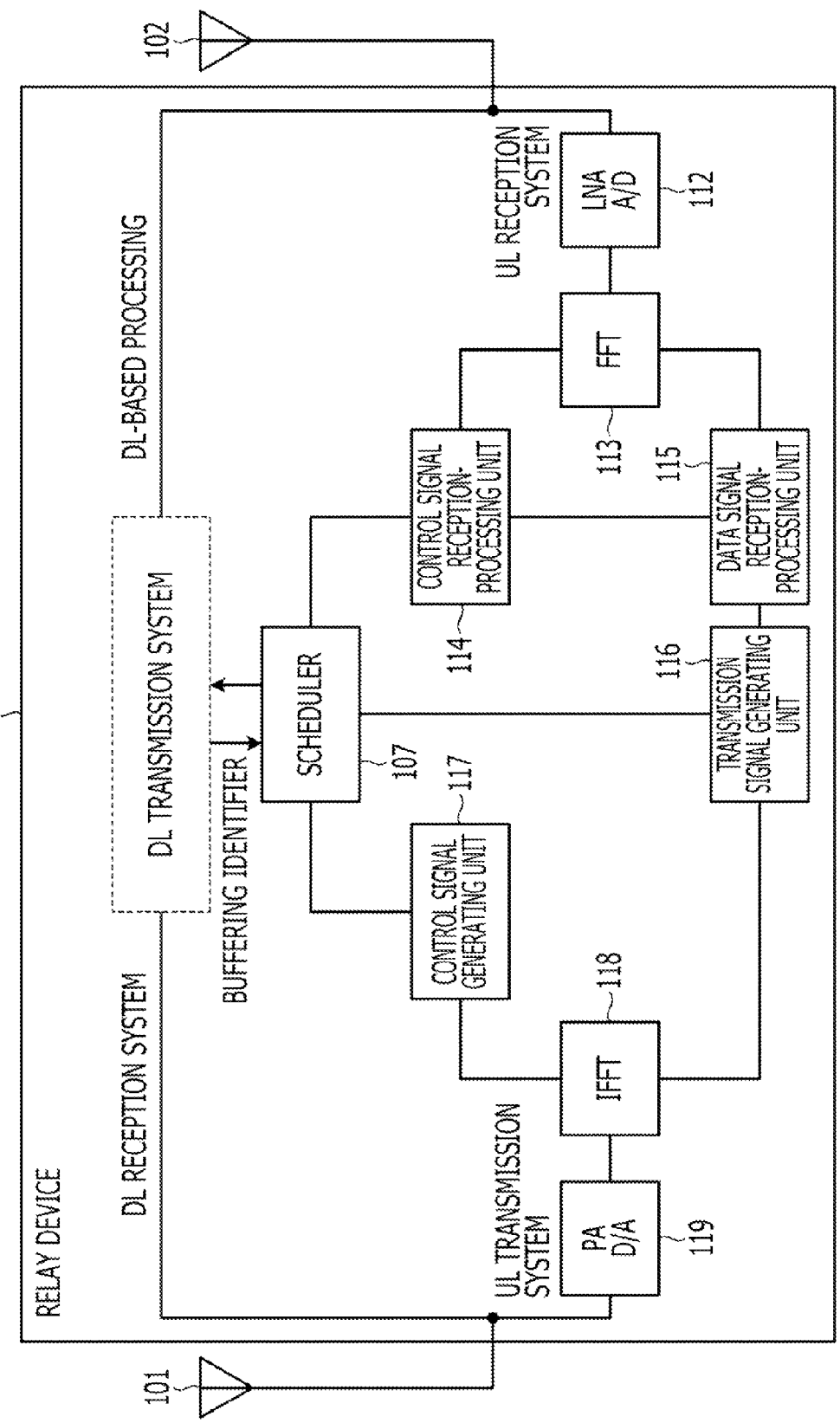
FIG. 19 is a diagram illustrating an exemplary configuration of a relay device according to a fifth embodiment.
Figure 20:
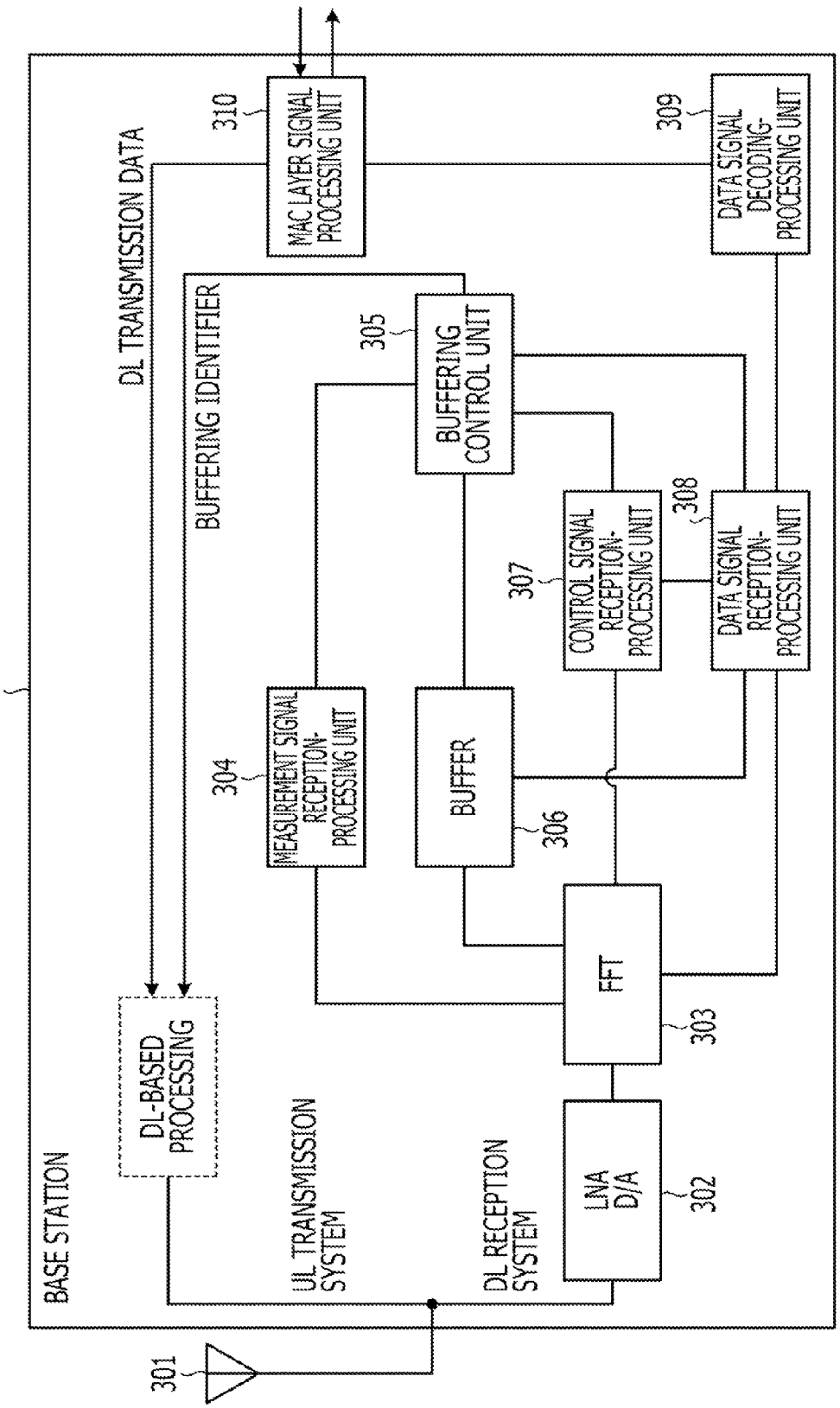
FIG. 20 is a diagram illustrating an exemplary configuration of a base station according to the fifth embodiment.
Figure 21:
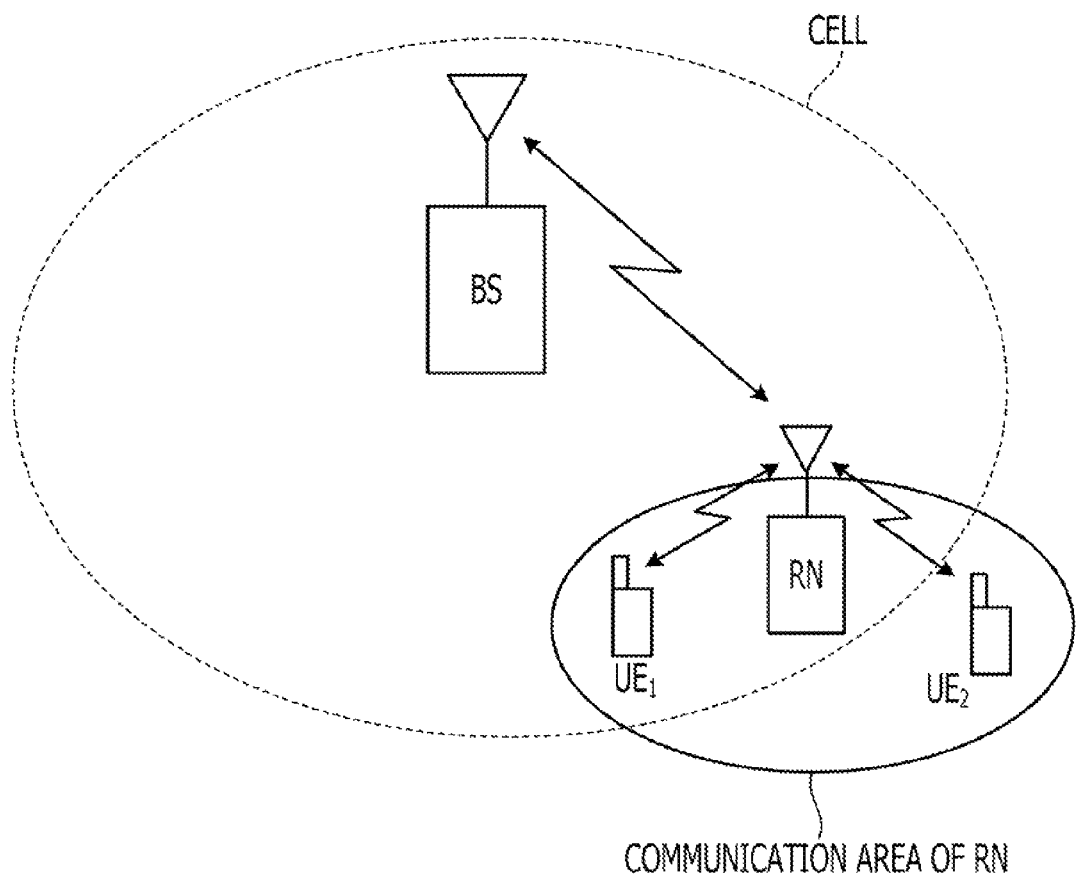
FIG. 21 is a diagram illustrating an exemplary configuration of a communication system according to a related technology.

(1) At the time of uplink, the processing at the time of downlink DL is mainly described in the above embodiments. Alternatively, the processing may be performed at the time of uplink UL. The processing at the time of uplink UL is performed in a direction opposite to the processing at the time of downlink (DL). Hereinafter, referring now to FIG. 19 and FIG. 20, the configuration of the relay device at the time of uplink UL and the configuration of the base station at the time of uplink UL will be described. FIG. 19 is a diagram illustrating an exemplary configuration of a relay device according to a fifth embodiment. FIG. 20 is a diagram illustrating an exemplary configuration of a base station according to the fifth embodiment.

As shown in FIG. 19, for example, a relay device 100 includes an antenna 101, an antenna 102, a LNA A/D 112, a FFT 113, a control signal reception-processing unit 114, a data signal reception-processing unit 115, and a scheduler 107. In addition, for example, the relay device 100 further includes a control signal generating unit 117, an IFFT 118, and a PA D/A 119. The same reference numerals are assigned to the same components as those of the aforementioned relay device 100. Each of the LNA A/D 112 and the PA D/A 119 is represented by one block for convenience. In practice, however, the LNA and the A/D are installed in the device as different analog circuits. Likewise, the D/A and the PA are also installed in the device as different analog circuits.

The antenna 101 sends, for example, a traffic from the terminal device to the base station as transmission using a UL band. Furthermore, for example, the antenna 102 receives traffic from the terminal device as reception using a UL band.

The LNA A/D 112 performs, for example, amplification of data received by the antenna 102 and analog-digital (AD) conversion thereof. Furthermore, for example, the FFT 113 performs fast Fourier transform. Furthermore, the data is divided into a data signal to be input into the data signal reception-processing unit 115 and a control signal to be input into the control signal reception-processing unit 114 after passing through the FFT 113.

For example, the control signal reception-processing unit 114 performs reception processing of the control signal received from the FFT 113. Then, the data signal reception-processing unit 115 is notified of control information, which represents a mode of communication from the terminal device to the relay device 100, as information obtained by the reception processing. The information obtained from the reception processing performed by the control signal reception-processing unit 114 includes not only the control information that represents a mode of communication from the terminal device to the relay device 100 but also other pieces of information, such as a buffering identifier used in DL-based processing. These kinds of information are managed by the scheduler 107.

Furthermore, for example, the data signal reception processing 115 performs reception processing on data, based on a data signal received from the FFT 113 and control information received from the control signal reception-processing unit 114. Furthermore, the data signal reception-processing unit 115 inputs data on which the reception processing has been completed, into the transmission signal generating unit 116.

The scheduler 107 manages various kinds of information for transmission/reception of data. For example, the scheduler 107 manages whether buffering is applied to the base station and then instructs to relay data to a relay destination when traffic reaches from the base station provided as a buffering target. The data relayed to the relay destination includes control information that represents a mode of communication between the terminal device and the relay device 100 and control information that represents a mode of communication between the relay device 100 and the base station.

Therefore, the scheduler 107 notifies the transmission signal generating unit 116 of two kinds of the control information: one representing the mode of communication between the terminal device and the relay device 100 and the other representing the mode of communication between the relay device 100 and the base station. Furthermore, the scheduler 107 notifies the control signal generating unit 117 of control information that represents a mode of communication between the relay device 100 and the base station.

For example, based on the data received from the data signal reception-processing unit 115 and the two kinds of control information received from the scheduler 107, the transmission signal generating unit 116 generates relay data to be relayed to the base station provided as a relay destination and then inputs the relay data into the IFFT 118. At this time, the transmission signal generating unit 116 adds the control information that represents the mode of communication between the terminal device and the relay device 100 to the data.

For example, based on the control information received from the scheduler 107, or the control information that represents the mode of communication between the relay device 100 and the base station, the control signal generating unit 117 generates a control signal and then inputs the control signal into the IFFT 118. In addition, for example, the IFFT 118 receives the data input from each of the transmission signal generating unit 116 and the control signal generating unit 117 and then returns the data into a time signal, followed by inputting the time signal into the PA D/A 119. For example, the PA D/A 119 DA-converts the signal received from the IFFT 118 and then amplifies the signal. Here, the scheduler 107, the control signal generating unit 117, the IFFT 118, the transmission signal generating unit 116, the data signal reception-processing unit 115, the FFT 113, and the control signal reception-processing unit 114 can be realized by a digital signal processor (DSP), an application-specific integrated circuit (ASIC), and a field programmable gate array (FPGA).

As shown in FIG. 20, for example, the base station 300 includes an antenna 301, a LNA D/A 302, a FFT 303, a measurement signal reception-processing unit 304, and a buffering control unit 305. In addition, for example, the base station 300 further includes a buffer 306, a control signal reception-processing unit 307, a data signal reception-processing unit 308, a data signal decoding-processing unit 309, and a MAC layer signal processing unit 310. For convenience, the LNA D/A 302 is represented by one block in the figure. In practice, however, the LNA and the A/D are installed as different analog circuits in the device.

For example, the antenna 301 receives a UL signal sent from the terminal device or the relay device 100 and then inputs the UL signal into the LNA D/A 302. Then, for example, the LNA D/A 302 amplifies a signal received from the antenna 301 and then DA-converts the received signal. Furthermore, for example, the FFT 303 performs fast Fourier transform to separate individual signals.

The signal separated by the FFT 303 is a known signal for measurement received from the terminal device. Such a signal is then input into the measurement signal reception-processing unit 304. In addition, for example, the signal separated by the FFT 303 is each of the relay data received from the relay device 100 and the received data received from the terminal device. These pieces of data are input into the buffer 306. Furthermore, for example, the signal separated by the FFT 303 is a UL control signal to be input into the control signal reception-processing unit 307. Moreover, for example, the signal separated by the FFT 303 is a UL data signal to be input into a data signal reception-processing unit 308.

The measurement signal reception-processing unit 304 receives the known signal for measurement from the FFT 303 and then converts the signal into an electric power profile as a measurement result, followed by inputting the profile into the buffering control unit 305.

For example, the buffering control unit 305 controls the buffer 306 by input of a buffer control signal that represents an instruction of providing an appropriate frame (timing) for storing data or inputs an instruction signal of likelihood combination into the data signal reception-processing unit 308 in the reception processing. Furthermore, for example, the buffer 306 receives an instruction from the buffering control unit 305 and then outputs buffer data to the data signal reception-processing unit 308.

For example, the control signal reception-processing unit 307 receives a UL control signal from the FFT 303 and then inputs the UL control signal into the data signal reception-processing unit 308. For example, the control signal reception-processing unit 307 receives a UL control signal from the FFT 303 and then inputs relay frame-timing information from the UL control signal into the buffering control unit 305 the UL control signal into buffering control unit 305, where the relay frame-timing information represents which frame (timing) is a relay frame.

The data signal reception-processing unit 308 performs reception processing, for example, based on the UL data received from the FFT 303, the buffer data received from the buffer 306, and the likelihood combination instruction signal received from the buffering control unit 305. The reception processing by the data signal reception-processing unit 308 performs likelihood combination of the data received from the replay device 100 and the buffering data received from the terminal device. Subsequently, the likelihood information obtained as a processing result is input into the data signal decoding-processing unit 309.

The data signal decoding-processing unit 309 performs decoding processing of data based on the likelihood information received from the data signal reception-processing unit 308 and then inputs the result of the decoding processing into the MAC layer signal processing unit 310. In addition, for example, the MAC layer signal processing unit 310 further transfers the result of the decoding processing received from the data signal decoding-processing unit 309 to a higher order processing unit. Here, for example, the FFT 303, the measurement signal reception-processing unit 304, the buffering control unit 305, the buffer 306, the control signal reception-processing unit 307, the data signal reception-processing unit 308, the data signal decoding-processing unit 309, and the MAC layer signal processing unit 310 can be realized by a digital signal processor (DSP), an application-specific integrated circuit (ASIC), and a field programmable gate array (FPGA).

Processing procedures, control procedures, specific names, information including various kinds of data and parameters (e.g., information of threshold used for obtaining an electric power profile), and so on, which has been described in the above description, the drawings, or the like may be arbitrarily changed if not otherwise specified.

Furthermore, each of the structural components of the wireless device and the data-collecting device shown in the drawings is represented as a functional conceptual constituent, so that it will be not necessarily constructed in a physical form as shown in the drawings. In other words, the distributed or integrated specific forms of the respective devices are not limited to those illustrated in the drawings. All or part of them may be functionally or physically distributed or integrated in an arbitrary unit according to any of various kinds of burdens, operating conditions, and so on. For example, in any of the above embodiments, the relay devices 100 have been described in different systems, DL and UL. Alternatively, one relay device 100 may include both systems, DL and UL or may be divided from each other.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

The invention claimed is:

1. A communication method using a communication system that includes a base station, a relay device, and a terminal device, the method comprising:
  the relay device,
    receiving first data from the base station, the first data including first control information that represents a first communication mode which is a mode of communication from the base station to the relay device,
    adding second control information to the received first data, the second control information representing a second communication mode which is a mode of communication from the relay device to the terminal device, and relaying second data to the terminal device, the second data including the first data added with the second control information; and the terminal device, receiving the first data of the first communication mode sent from the base station to the relay device, storing the first data in a buffer, performing reception processing on the second data based on the second control information included in the second data, performing reception processing on the first data based on the first control information included in the second data, and combining the first and second data on which the reception processings have been performed, wherein the terminal device measures a signal transmitted from the base station to determine whether a reception level of the measured signal is substantially equal to or greater than a predetermined threshold, and notifies the relay device of execution information indicating that reception processing is performed on the first data when it is determined that the reception level is substantially equal to or greater than the predetermined threshold; and the relay device relays the second data that includes the second control information upon notification of the execution information from the terminal device.

2. The communication method according to claim 1, wherein the relay device describes the first control information and the second control information on a control information area in the second data that is previously defined in the first data.

3. The communication method according to claim 1, wherein when receiving the first data sent from the base station to a plurality of relay devices, the terminal device stores only the first data that corresponds to the relay device among the plurality of relay devices.

4. A communication method using a communication system that includes a base station, a relay device, and a terminal device, the method comprising:

the relay device, receiving first data from the base station, the first data including first control information that represents a first communication mode which is a mode of communication from the base station to the relay device, adding second control information to the received first data, the second control information representing a second communication mode which is a mode of communication from the relay device to the terminal device, and relaying second data to the terminal device, the second data including the first data added with the second control information; and the terminal device, receiving the first data of the first communication mode sent from the base station to the relay device, storing the first data in a buffer, performing reception processing on the second data based on the second control information included in the second data, performing reception processing on the first data based on the first control information included in the second data, and combining the first and second data on which the reception processings have been performed, wherein the terminal device measuring a signal sent from the base station;

the terminal device determining a weighting applied to the combination between the second data in the second communication mode, on which the reception processing is performed and the first data in the first communication mode, on which the reception processing is performed, on the basis of a reception level of the measured signal; and combines the second data in the second communication mode and the first data in the first communication mode with each other at a combination ratio.

5. A relay device that relays data between a base station and a terminal device, the relay device comprising:

a data-receiver configured to receive first data from the base station, the first data including first control information that represents a first communication mode which is a mode of communication from the base station to the relay device;

an execution information receiver configured to receive execution information from the terminal device indicating the data from the base station is buffered in the terminal device; and a data-transmitter configured to add second control information to the first data received by the data-receiver, the second control information representing a second communication mode which is a mode of communication from the relay device to the terminal device, and relays second data to the terminal device, the second data including the first data added with the second control information, wherein the terminal device measures a signal sent from the base station, determines a weighting applied to the combination between the second data in the second communication mode, on which the reception processing is performed and the first data in the first communication mode, on which the reception processing is performed, on the basis of a reception level of the measured signal, and combines the second data in the second communication mode and the first data in the first communication mode with each other at a combination ratio.

6. A communication method using a communication system that includes a base station, a relay device, and a terminal device, comprising:

the relay device, receiving first data from the terminal device, the first data including first control information representing a first communication mode which is a mode of communication from the terminal device to the relay device, adding second information to the first data containing the first control information, the second information representing a second communication mode which is a mode of communication from the relay device to the base station, and sending a second data added with the second control information to the base station; and the base station, receiving first data sent from the terminal device to the relay device in the first communication mode, storing the received first data in a buffer, performing reception processing on the second data relayed from the relay device in the second communication mode based on the second control information included in the second data, performing reception processing on the stored received first data based on the first control information included in the second data, and combining the second data and the received first data that are subjected to the reception processing, wherein the terminal device measures a signal sent from the base station, determines a weighting applied to the combination between the second data in the second communication mode, on which the reception processing is performed and the first data in the first communication mode, on which the reception processing is performed, on the basis of a reception level of the measured signal, and combines the second data in the second communication mode and the first data in the first communication mode with each other at a combination ratio.

\* \* \* \* \*